(12) United States Patent     (10) Patent No.:   US 12,701,187 B2

Meeler     (45) Date of Patent:     Aug. 4, 2026

(54) METHOD AND SYSTEM FOR REDIRECTING UNWANTED TELEPHONE CALLS

(71) Applicant: Daniel Meeler, Boca Raton, FL (US)

(72) Inventor: Daniel Meeler, Boca Raton, FL (US)

(73) Assignee: Precise Media LLC, Boca Raton, FL (US)

( * ) Notice: Subject to any disclaimer, the term of this patent is extended or adjusted under 35 U.S.C. 154(b) by 155 days.

(21) Appl. No.: 18/665,074

(22) Filed: May 15, 2024

(65) Prior Publication Data

US 2025/0358369 A1     Nov. 20, 2025

(51) Int. Cl.
| | |
|---|---|
| *H04M 3/436* | (2006.01) |
| *H04M 3/42* | (2006.01) |
| *H04M 3/54* | (2006.01) |

(52) U.S. Cl.
CPC ....... *H04M 3/436* (2013.01); *H04M 3/42059* (2013.01); *H04M 3/4365* (2013.01); *H04M 3/541* (2013.01)

(58) Field of Classification Search
None
See application file for complete search history.

(56) References Cited

U.S. PATENT DOCUMENTS

| | | | |
|---|---|---|---|
| 10,951,756 B1* | 3/2021 | Silverstein ............ | H04M 3/436 |
| 11,102,344 B1* | 8/2021 | Buentello ........... | G10L 15/1822 |
| 2011/0294478 A1* | 12/2011 | Trivi ..................... | H04M 3/436 |
| | | | 455/415 |
| 2012/0128144 A1* | 5/2012 | Chislett ............... | H04L 65/1079 |
| | | | 379/201.01 |
| 2014/0105373 A1* | 4/2014 | Sharpe ................... | H04M 3/38 |
| | | | 379/142.05 |
| 2014/0302814 A1* | 10/2014 | Roncoroni ............ | H04M 15/41 |
| | | | 455/408 |
| 2015/0256679 A1* | 9/2015 | Burnett ................. | H04M 3/533 |
| | | | 379/88.12 |
| 2017/0134575 A1* | 5/2017 | Quilici .............. | H04M 3/53391 |
| 2018/0048759 A1* | 2/2018 | Sharpe ................... | H04M 3/38 |
| 2018/0131799 A1* | 5/2018 | Kashimba ......... | H04M 3/42059 |
| 2018/0191896 A1* | 7/2018 | Beardow ........... | H04M 1/72469 |
| 2018/0249006 A1* | 8/2018 | Dowlatkhah ......... | H04W 16/18 |

* cited by examiner

*Primary Examiner* — Quoc D Tran

(74) *Attorney, Agent, or Firm* — Harness, Dickey & Pierce, P.L.C.

(57) ABSTRACT

A method and system of redirecting phone calls includes storing a plurality of unwanted phone numbers in a database, receiving, at a user device, a phone call signal having a phone number associated therewith, forwarding the phone call to a Voice over Internet Protocol (VoIP) system, determining whether the phone number is in the database, and when the number is stored in the database, forwarding the phone call to a call center from the VOIP system.

16 Claims, 27 Drawing Sheets

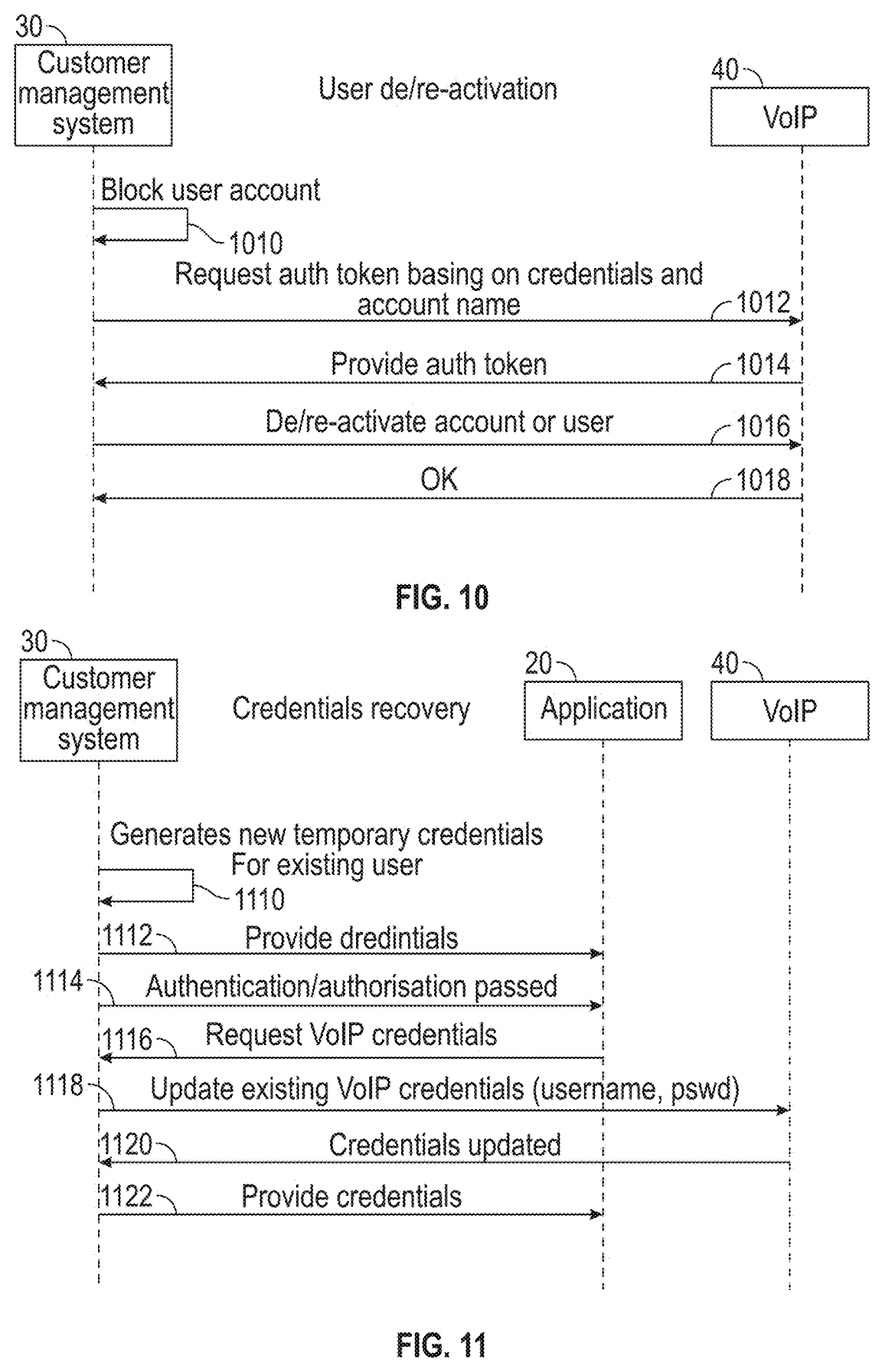

30 —

| Customer management system |

User de/re-activation

40 —

| VoIP |

Block user account

~1010

Request auth token basing on credentials and account name ⌐1012

Provide auth token ⌐1014

De/re-activate account or user ⌐1016

| Customer management system |

Credentials recovery

20 —

| Application |

40 —

| VoIP |

Generates new temporary credentials For existing user ~1110

1112 — Provide dredintials

1114 — Authentication/authorisation passed

1116 — Request VoIP credentials

1118 — Update existing VoIP credentials (username, pswd)

1120 — Credentials updated

1122 — Provide credentials

FIG. 11

METHOD AND SYSTEM FOR REDIRECTING UNWANTED TELEPHONE CALLS

FIELD

The present disclosure relates to a system and method for redirecting phone calls from unwanted parties.

BACKGROUND

This section provides background information related to the present disclosure which is not necessarily prior art.

Debt collectors have a reputation for being relentless in calling clients with threats. Often times, a person has several debt collectors trying to collect debts. The number of phone calls is unproductive and distributing to a person's life. Reducing personal disturbance from unwanted calls is desirable.

SUMMARY

This section provides a general summary of the disclosure and is not a comprehensive disclosure of its full scope or all of its features.

The present system provides a mechanism to allow debt collectors to be redirected to a debt resolution company and therefore not disturb the debtor continually.

In one aspect of the disclosure, a method of redirecting phone calls includes storing a plurality of unwanted phone numbers in a database, receiving, at a user device, a phone call signal having a phone number associated therewith, forwarding the phone call to a Voice over Internet Protocol (VoIP) system, determining whether the phone number is in the database; and when the number is stored in the database, forwarding the phone call to a call center from the VOIP system.

In another aspect of the disclosure, a system for redirecting phone calls includes a database storing a plurality of unwanted phone numbers, a Voice over Internet Protocol (VoIP) system in communication with the database and a user device in communication with the VoIP system. The user device receives a phone call signal having a phone number associated therewith. The user device forwards the phone call to the VoIP system when the phone number is not in a contact list of the user device. The system further includes a call center. The VoIP system determines whether the phone number is in the database. When the number is stored in the database, the VoIP system forwards the phone call to the call center.

In yet another aspect of the disclosure, a method of redirecting phone calls incudes storing a plurality of unwanted phone numbers in a database, receiving, at a user device, a phone call signal having a phone number associated therewith, forwarding the phone call to a Voice over Internet Protocol (VoIP) system, determining whether the phone number is in the database and when the number is stored in the database, blocking the phone call.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a flow diagram for deactivating or reactivating the user.

FIG. 11 is a flow diagram for recovery of credentials.

Corresponding reference numerals indicate corresponding parts throughout the several views of the drawings.

DETAILED DESCRIPTION

Example embodiments will now be described more fully with reference to the accompanying drawings.

Figure 1:
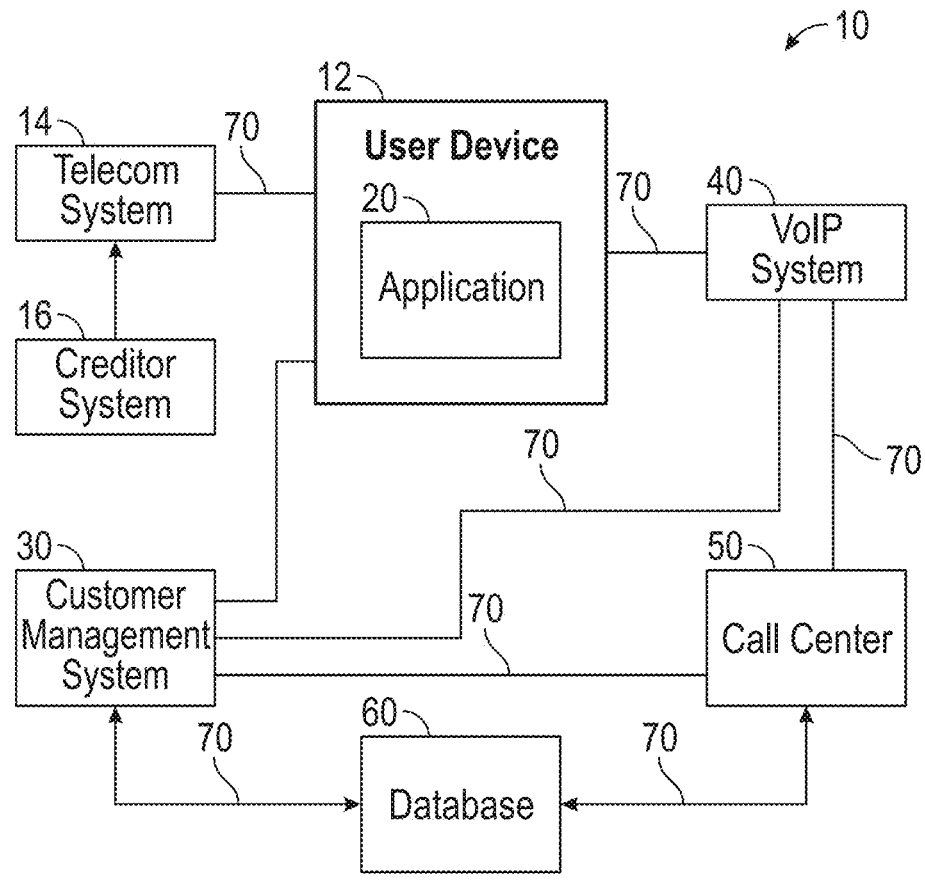
FIG. 1 is a block diagrammatic view of the system according to the present disclosure.

Referring now to FIG. 1, a telephone call redirection system 10 is illustrated. The redirection system 10 has a user device 12 that receives telephone signals that correspond to a telephone (phone) call from a telecom system 14. That is, the phone call is an electrical (or optical) signal that can be transferred, switched and routed to various system equipment and devices. The telecom system 14 generates wired or wireless telephone signals that are communicated to the user device 12. The telephone signals include the voice communication data and caller identification data. The caller identification data corresponds to the telephone number from which the telephone signal originates.

One example of a location for originating telephone signals is a creditor system 16. The creditor system 16 is a phone system that may be manual, automated or partial automated. The creditor system 16 communicates telephone signals with caller ID data through the telecom system 14 to a plurality of different user devices 12, one of which is illustrated in FIG. 1. Every creditor may have a creditor system 16 each of which may use multiple phone numbers.

The user device 12 is a telephone or a device that has the capability of being used as a telephone. The user device 12 may be a fixed device or a mobile device. An example of a fixed device is a desktop computer that is configured to receive telephone signals in a wired or wireless manner. A mobile telephone receiving and transmitting wireless signals is an example of a mobile user device. The user device 12 has an application or app 20 that is used for the many purposes described below. The app 20 and the user device 12 may identify calls associated with a creditor for redirection as described below.

A customer management system 30 is used for performing various functions including being in communication with the user device 12. The user device 12 and the customer management system 30 interact to establish a user account and perform various other functions described below.

A voice over IP (VoIP) system 40 is in communication with the user 12 and the customer management system 30. The VoIP system is used for many purposes including forwarding telephone signals to a call center 50. The VoIP system 40 also has voicemail capabilities for recording or storing voicemails and generating notifications to the user device 12 and, in particular, the application 20 therein.

The call center 50 is used for answering calls or storing voicemails when calls are unanswered. The voicemails stored at the call center may correspond to and be identified by a user identifier so that the user device from which they originated may be identified.

A database 60 may be a separate entity as illustrated in FIG. 1. However, the database 60, as described below, may be part of a customer management system 30 or the call center 50. The database 60 is used to store telephone numbers of creditors or phone numbers for unwanted calls (unwanted phone numbers). The database stores the unwanted phone numbers associated with various users. The database 60 may also store multiple numbers for a creditor. Many creditors have multiple numbers. If someone wants to block a certain bank or institution, all the numbers associated with the bank may be blocked. As set forth below, when a new phone number for a bank or institution is discovered, that phone number may be added to the database 60.

The interconnections between the various devices set forth in FIG. 1 are formed by a network 70. The network 70 represents one or a plurality of networks that may be a wired network, a wireless network or combinations thereof. The network 70 may use various types of protocols including an internet protocol (IP).

Figure 2:
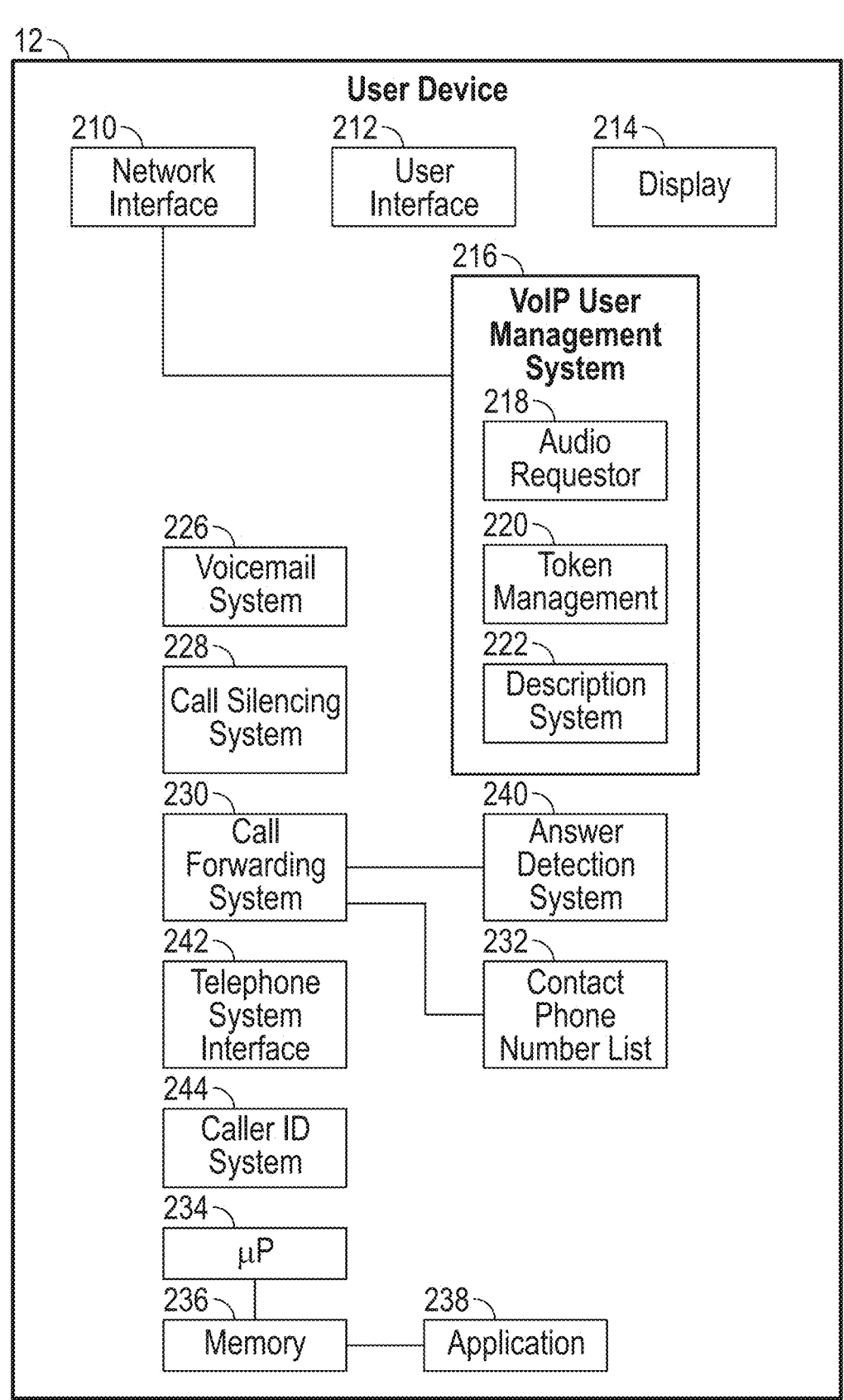
FIG. 2 is a block diagrammatic view of the user device of the system of FIG. 1.

Referring now to FIG. 2, the user device 12 is shown in further detail. The user device 12 has a network interface 210 that is used for communicating data and receiving data from the network 70. The network interface 210 may include a modulator/demodulator (modem).

A user interface 212 may be a keyboard, button or other switches used for inputting data into a system. The user interface 212 may also be incorporated into a display 214 when the display 214 is a touchscreen display. The display 214 is used for generating a plurality of screen displays, examples of which are described in greater detail below.

The user device 12 includes a voice over internet protocol (VoIP) user management system 216. The VoIP user management system 216 is used to interface with the voice over IP system 40 illustrated in FIG. 1 and may include an application interface (API). The VoIP user management system 216 may have an audio requestor 218 for requesting and receiving audible electrical signals that correspond to a voicemail located at the VoIP system 40. The VoIP user management system 216 also includes a token management system 220 that is used to manage tokens that communicated between the VoIP system 40 and the user device 12. The VoIP user management system 216 may use the token received from the token management system 220 for decryption in a decryption system 222. Decryption may take place when signals, such as voicemail signals are encrypted at the VoIP system 40.

The user device 12 may be a telephone that performs various other telephone types of functions. The user device 12 may include a voicemail system 226 that may enabled and disabled. The voicemail system 226 may be part of the phone carrier provider. The user device 12 may also include a call silencing system 228. The call silencing 28 may be activated or deactivated. The call silencing system 228 may prevent calls from ringing or vibrating at the user device.

The user device 12 may also include a call forwarding system 230. Call forwarding system 230 is used for forwarding telephone calls to the VoIP system 40 through the VoIP user management system 216. The call forwarding system 230 may be in contact with a contact phone number list 232. The contact phone number list 232 stores phone numbers associated with the contacts of the user device.

The user device 12 also includes a microprocessor or processor 234 that is in communication with a memory 236. An application 238 may be stored within the memory 236 and is used to perform various functions. The memory 236 may be non-transitory computer readable medium that includes machine readable instructions that are executable by the processor 234. The application 238 may perform specific functions and be included within the memory 236. At least some of the boxes in FIG. 2A correspond to functions to may be performed by the application 238 and the microprocessor 234. The user device 12 may also include an answer detection system 240. The answer detection system 240 may be in communication with the call forwarding system 230 to detect when a call has been answered.

The user device 12 may include a telephone system interface 242. The telephone system interface 242 may be used to communicate with the telecom system 14. It should be noted that the telephone system interface 242 may also be incorporated within the network interface 210. The telephone system interface 242 receives a telephone call from the telecom system 14. A caller identification system 244 may be used to receive the telephone number associated with the telephone call. The caller identification system 244 and the telephone number associated with the call may be used to perform various functions as described above.

Figure 3:
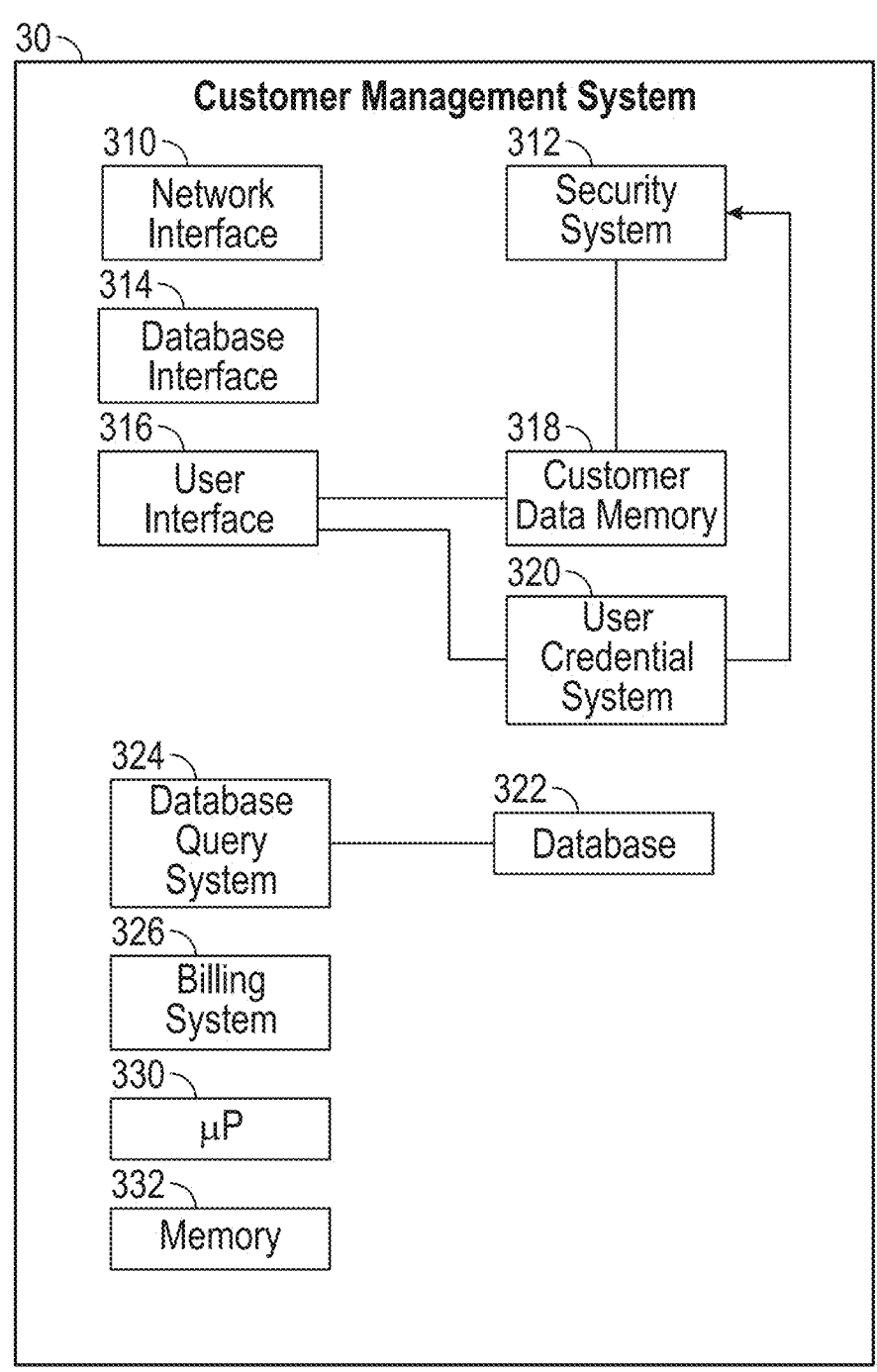
FIG. 3 is a block diagrammatic view of the customer management system of FIG. 1.

Referring now to FIG. 3, the customer management system 30 is illustrated in further detail. A customer management system 30 also has a network interface 310 that is used for communicating with the other devices in the system 10. The network interface 310 communicates and receives data through the network 70 illustrated in FIG. 1. The network interface 310 may also have application programming interfaces for interfacing specifically with the various devices as described above.

The customer management system 30 includes a security system 312. The security system 312 may provide security for communicating between various devices including establishing passwords, user identifiers and the like. The security system 312 may also be used to authenticate various processes including the adding of a user to the VoIP system 40. This may include receiving or providing an authorization token and the like.

The customer management system 30 may also have a database interface 314. The database interface 314 may be used to communicate data to and from the database 60 illustrated in FIG. 1.

A user interface 316 may be used by personnel associated with the customer management for inputting data into the system. The user interface 316 may also be an automated or partial automated system. The user interface 316 may be used for inputting account data as well for establishing accounts for various users. The customer data 318 may be stored in a customer data memory 318. A customer data memory 318 may be used together with the security system 312. The customer management system 30 may be used to generate temporary credentials or verify existing credentials at a user credential system 320.

A database 322 may be located within the customer management system 30. The database 322 may be used in addition to or instead of the database 60. The database 322 may be used to store phone numbers, creditors, or phone numbers from which calls are not wanted (unwanted phone numbers). The database 322 may be accessed through a database query system 324. The database query system 324 may search for data within the database such as for unwanted phone numbers from creditors. The database query 324 may also be used to communicate with the database when located outside the customer management system. The database 322 may include the customer data memory 318 therein.

A billing system 326 may also be part of the customer management system 30. The billing system 326 may bill and collect fees for the unwanted phone call blocking service.

A microprocessor or processor 330 is in communication with a memory 332. The processor 330 performs various functions. The memory 332 is a non-transitory computer-readable medium that includes machine readable instructions that are executable by the processor 330 for performing various functions according to various instructions. The memory 332 may include the database 322 and the customer data memory 318 that had been shown as separate devices illustrated above.

Figure 4:
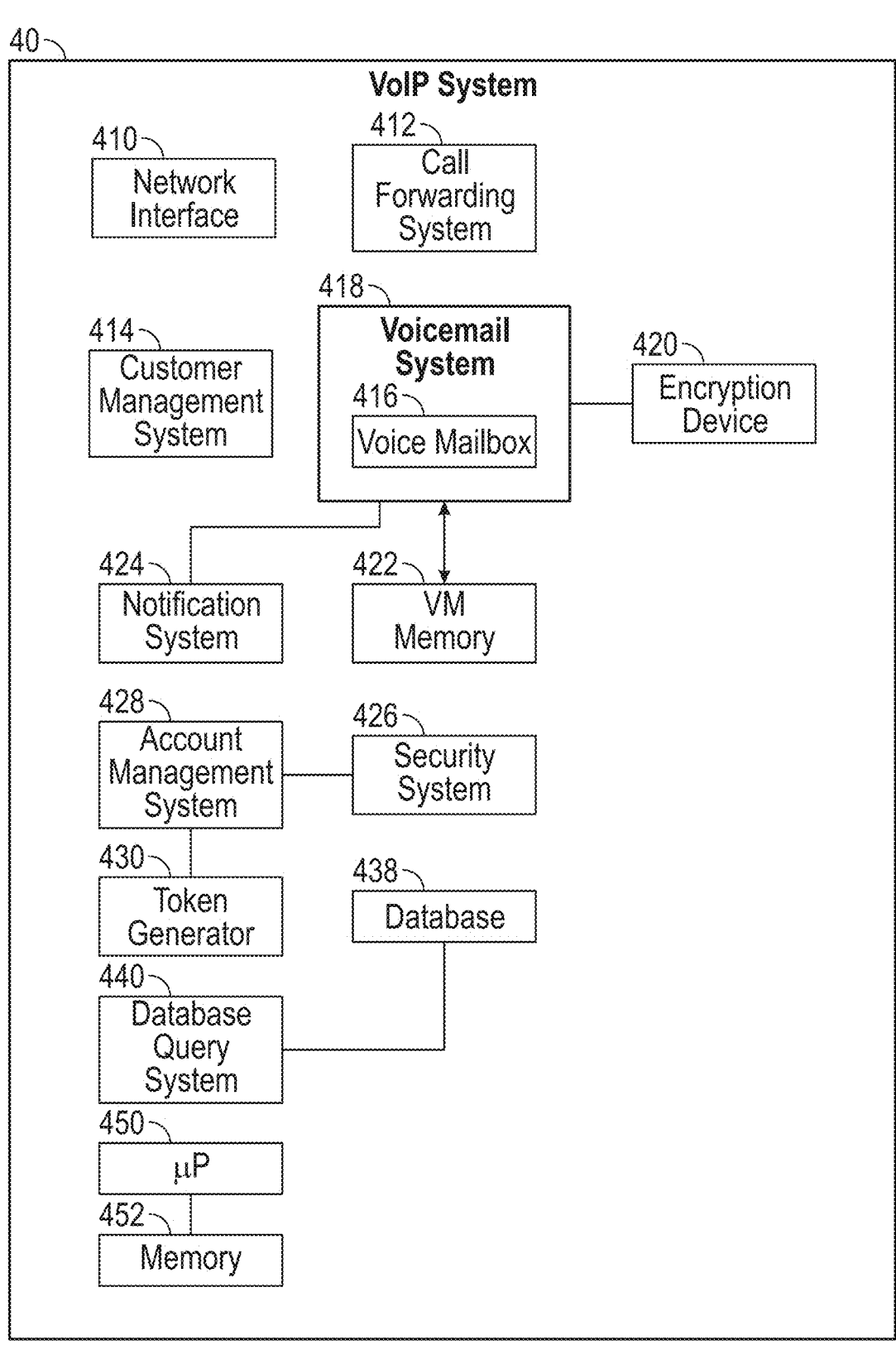
FIG. 4 is a block diagrammatic view of a voice over internet protocol system of FIG. 1.

Referring now to FIG. 4, the VoIP system 40 is illustrated in further detail. The VoIP system 40 includes a network interface 410. The network interface 410 is used to communicate with the other devices including the application 20 within the user device 12. The network interface 410 communicates signals through and receives signals from the network 70. The VoIP system 40 includes a call forwarding system 412 that is used to forward telephone calls that are associated with unwanted phone numbers or creditor phone numbers as will be described in greater detail below.

The VoIP system 40 also includes a customer management system 414. The customer management system 414 is used for managing customer data and establishing various customer specific functions such as establishing a voice mailbox 416 within a voicemail system 418. The voicemail system 418 is used to store various voicemails associated with various users in the voice mailbox 416 Each of the voicemails has encryption provided by the encryption device 420. The encryption device 420 may encrypt all voicemails within the voice mailbox 416 so that they can be securely retrieved by the user device 12. The voicemail system 418 stores voicemails and identification data such as the phone number associated with the voicemail within a voicemail memory 422. The voicemail system 418 may also be associated with a notification system 424. The notification system 424 generates a notification that is communicated through the user interface 410 when a voicemail is received. The notification system 424 generates a notification signal that may appear as an indicator on the display of the user device.

The voicemail system 418 may also be associated with a security system 426. The security system 426 may provide access to the voicemail system upon the proper authorization including tokens, passwords and the like. An account management system 428 is used for establishing accounts of various users through direct communication of signals between the user and the VoIP system or the customer management system and the VoIP system 40. The account management system 428 may also be used to generate tokens at a token generator 430.

Similar to that mentioned above, the VoIP system 40 may include a database 438 and a database query system 440. The database 438 may be used instead of or in addition to the database 60 illustrated in FIG. 1. The database query system 440 may be used to query for various data at the database 438 or the database 60. The query may, for example, be whether a phone number is unwanted or on a creditor list.

The VoIP system 40 may also include a microprocessor or processor 450 and a memory 452. The memory 452 is a non-transitory computer-readable medium that includes machine readable instructions that are executable by the processor to perform various functions. Many of the functions described above may use the memory 452 for storing various data including the voicemail memory 422. The microprocessor or processor 450 may be used to perform the function of many of the systems described above. Details of the many functions are set forth below.

Figure 5:
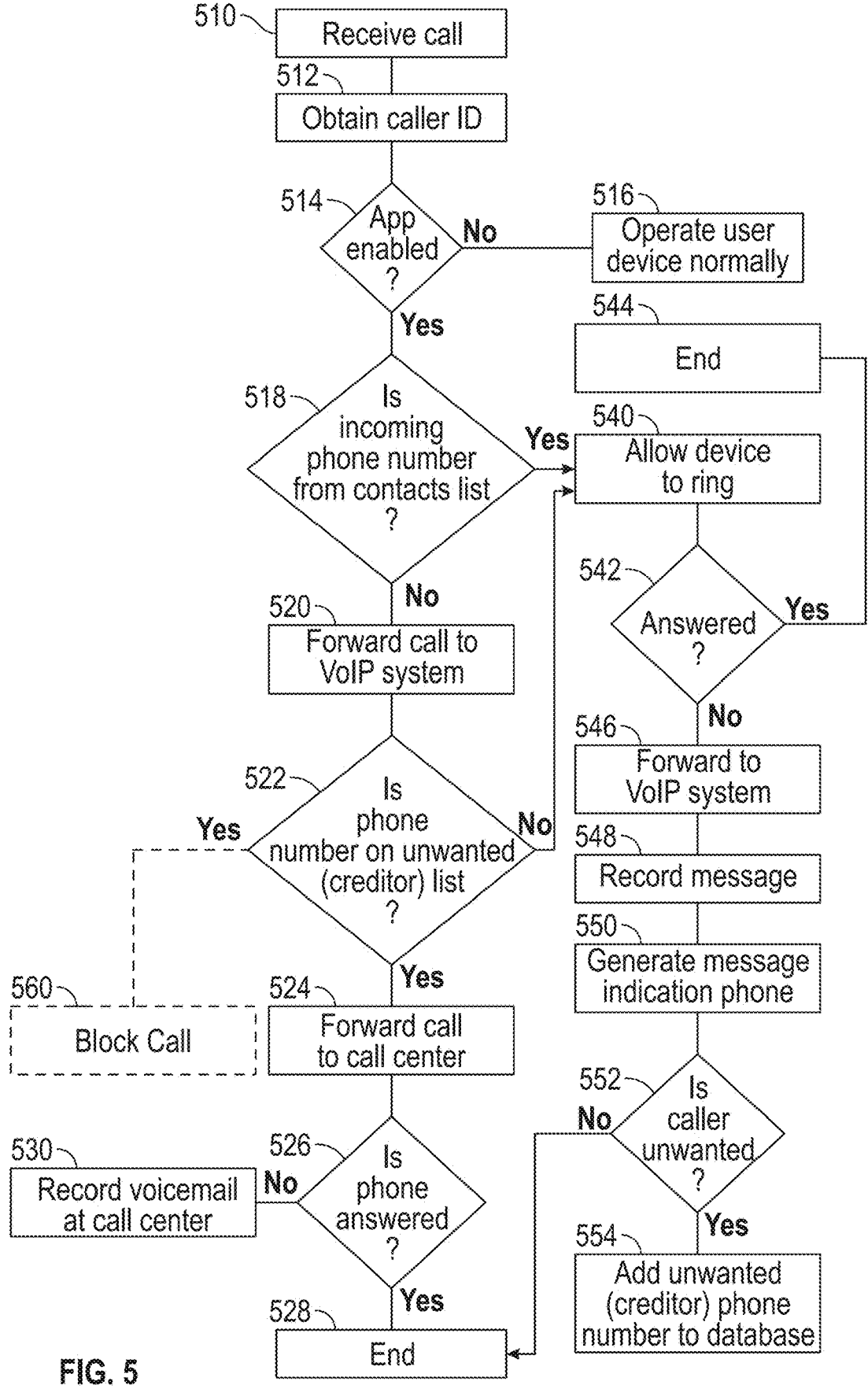
FIG. 5 is a flowchart of a method for blocking calls according to the present disclosure.

Referring now to FIG. 5, a high level method for processing a telephone call at an application of the user device 12 is set forth. In step 510, a call is received. The call is received at the user device 12 from the telecom system 14. In step 512, the caller identification signal is used to obtain the caller identification data. In step 514, it is determined whether the application associated with call management for unwanted phone numbers is enabled. If the application is not enabled, the user device is operated normally in step 516.

When the app is enabled, the incoming phone number is compared to the contacts list in step 518. When the incoming phone number is not from within the contacts list within the user device in step 518, step 520 is performed. In step 520 the call is forwarded to the VoIP system. Thereafter, step 522 compares the phone number to the unwanted phone number list or creditor list. That is, the phone number identified by the caller ID system may be communicated to the customer management system 30 used within the VoIP system 40 to form the comparison. The phone number of the call is compared to the database of creditors or to the unwanted list. When the phone number associated with the caller ID is in the database the phone number is unwanted or a creditor.

Then, step 524 forwards the telephone call to the call center 50. After step 524, step 526 determines whether the phone has been answered at the call center. The system ends the process in step 528 when the phone is answered at the call center. The call center may provide a plurality of lawyers or professionals that answer questions and act on behalf of the client or user associated with the user device.

In step 526, when the phone is not answered by the call center, the call center may have voicemail system. The voicemail system may be activated and a voicemail may be recorded and stored at the call center 50.

Referring back to step 518, when the incoming phone number is on the contacts list or in step 522 when the phone number is not on the unwanted list, step 540 allows the telephone to ring. In step 542, the system or app determines whether the phone is answered. When the phone is answered, step 544 ends the process. In step 542, when the phone is not answered, the system forwards the call to the VoIP system in step 546. In step 548, the message is recorded at the VoIP system. The message may be stored in an encrypted format. In step 550, a voicemail notification signal may be communicated to the telephone and displayed on the display of the user device. The voicemail notification may be an email notification or a text notification.

After step 550, step 552 determines whether the call is unwanted. The caller and the phone number associated therewith may be provided on the screen of the user device. The call, when unwanted, may have left a voicemail indicating they are a creditor or an unwanted caller. The display associated with the phone or user device may generate a query as to whether the phone number should be added to the creditor or unwanted caller database. In step 554, the unwanted or creditor phone number is added to the database. In this manner, as creditors change their phone numbers, a plurality of users acting as a crowd may be used to update the credit or unwanted database.

Referring back to step 522, an optional alternate affirmative path may be taken when forwarding to a call center is not desired. A setting from the application may be selected to perform this should the system have both forwarding and block capabilities. After step 522, optional step 560 may be performed. In step 560, the call may be blocked at the VoIP system when the number is on the unwanted or creditor list. Blocking the call refers to preventing the phone call from going further. More specifically, blocking means at least one of no voice mailbox recording is recorded or activated, the call does not ring at the user device and the call is not forwarded to a call center. The system ends the process and waits for a new call after step 560.

Figure 6A:
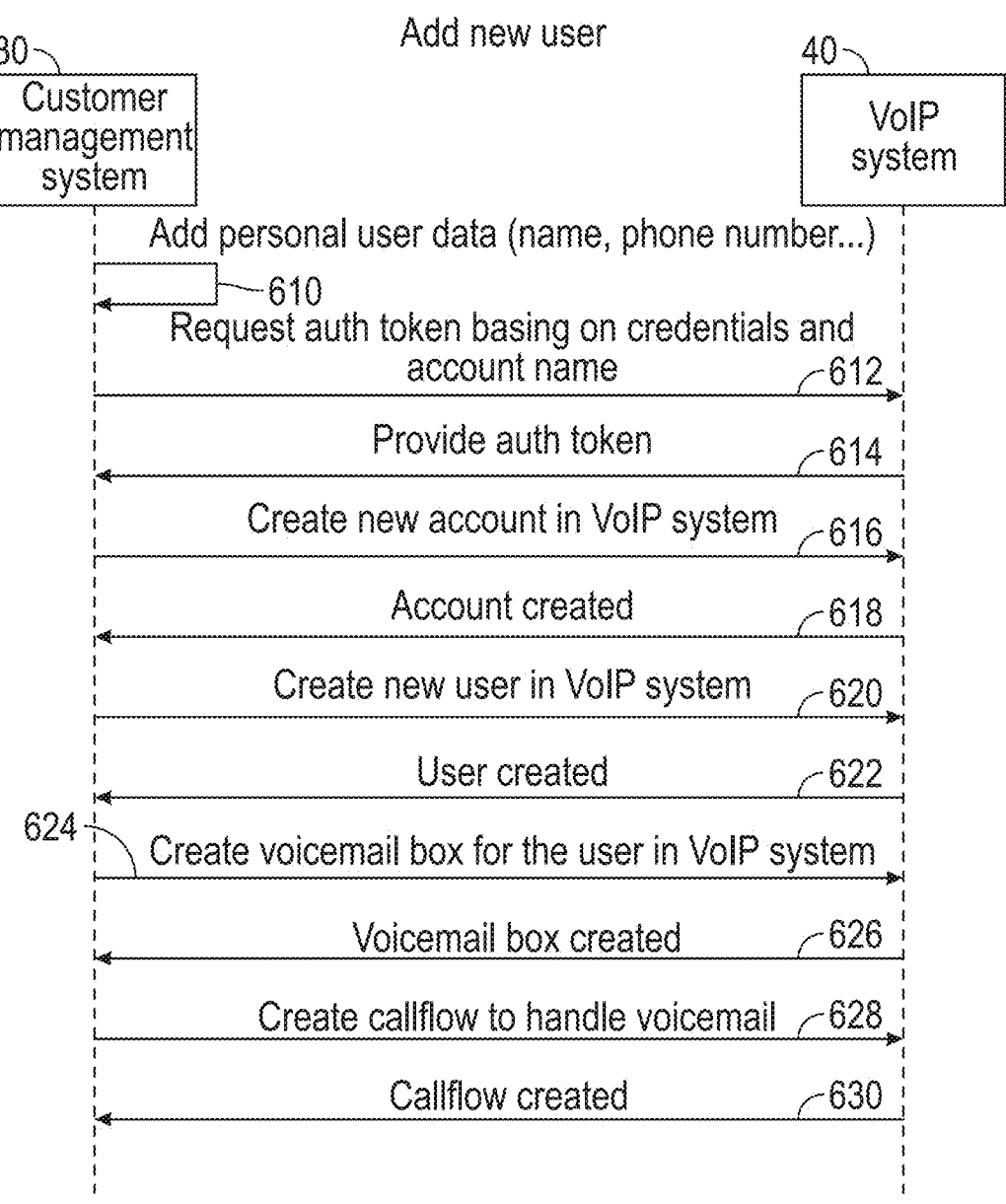
FIG. 6A is a flow diagram of signals used for adding new users.

Referring now to FIG. 6A, a flow diagram for adding a user to the system is set forth. The process uses the customer management system 30 and the VoIP system 40. The customer management system 30 adds personal user data, such as the name and phone number, through the user interface 316 described above. The personal user data may be stored within the customer data memory 318. Several types of data and attributes may be stored in step 610. In step 612, an authorization token may be generated at the customer management system 30 based on the credentials and provided to the VoIP system 40 together with the account name. In step 614, the VoIP system 40 provides an authorization token to the customer management system 30. In step 616, a new account request signal is communicated to the VoIP system 40. Because the credentials and the like were provided in step 612, step 618 generates an account created signal that is communicated to the customer management system 30. A request for a new user that is associated with the account is communicated from the customer management system to the VoIP system 40. In step 622, a user may be created and user created signal is generated at 622 and communicated to the customer management system 30. In step 624, a request to create a voicemail box for the user that was created in step 622 is provided to the VoIP system 40. In step 626, a signal indicating that the voicemail box has been created is communicated to the customer management system from the VoIP system 40. In step 628, a call flow to handle voicemail may be established between the customer management system and the VoIP system 40. A confirmation signal that the call flow has been created in step 630 may be communicated from the VoIP system 40 to the customer management system 30.

Figure 6B:
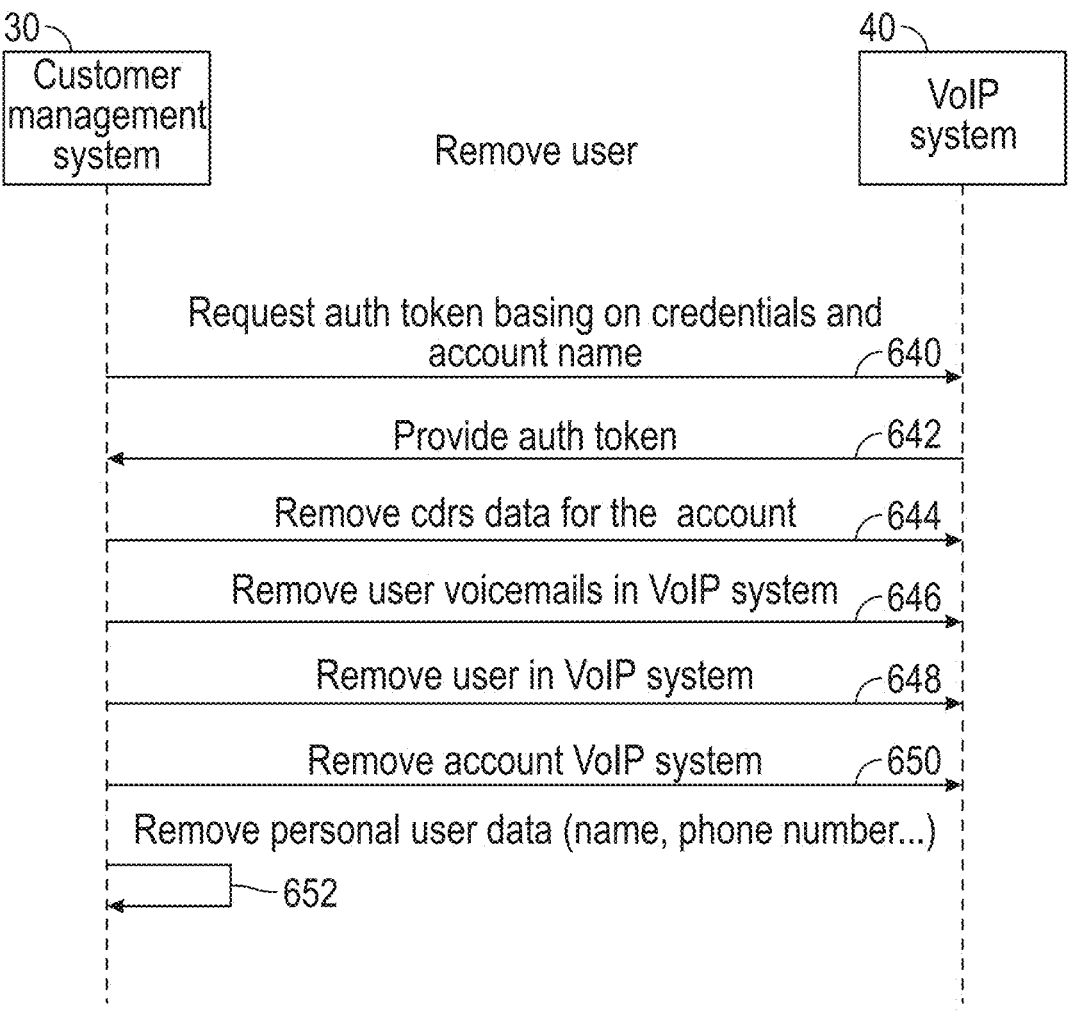
FIG. 6B is a flow diagram for removing users from the system.

Referring now to FIG. 6B, removing a user from the system is set forth. In step 640, an authorization token based on the credentials and the account name is communicated from the customer management system 30 to the VoIP system 40. In step 642, an authorization token is communicated from the VoIP system 40 to the customer management system 30.

In step 644, the customer data record (CDR) is requested to be removed from the VoIP system 40 from the customer management system 30. In step 646, a request to remove voicemails stored in the VoIP system 40 is requested. In step 648, a request to remove the user from the VoIP system 40 is communicated from the customer management system 30 to the VoIP system 40. In step 650, the removal of the account is requested from the customer management system 30 and communicated to the VoIP system 40. In step 652, the personal user data from step 610 is removed from the customer management system. In this manner, all data from the user may be removed.

Figure 7:
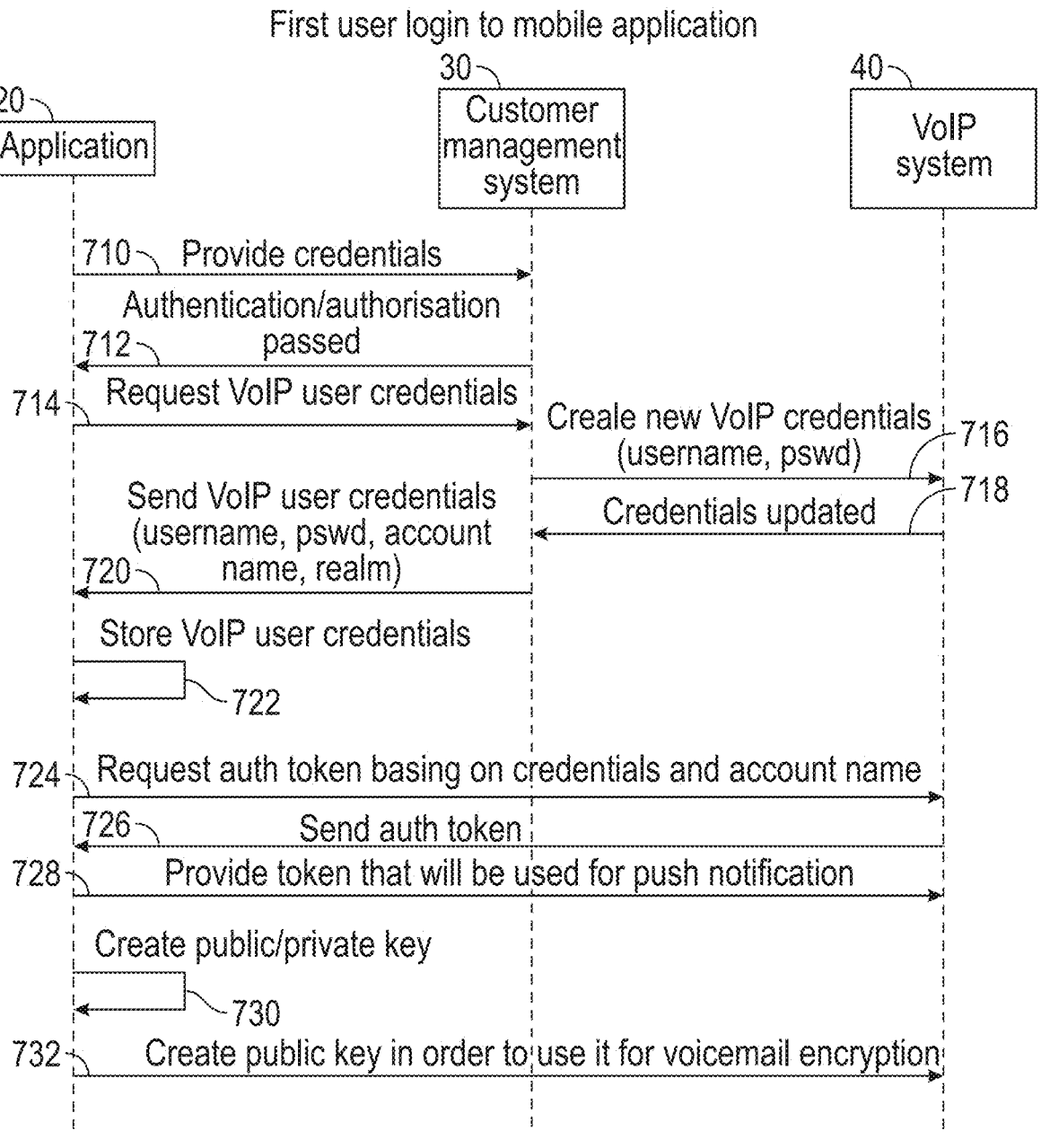
FIG. 7 is a flow diagram of the signal views when the user first logs into the application.

Referring now to FIG. 7, the interaction of the application 20, the customer management system 30 and the VoIP system 40 is set forth. When a user first logs into the system, credentials are provided in step 710. A "passed" signal is communicated based on the authorization from the customer management system 30 to the application in step 712. In step 714, a request for the VoIP system user credentials is communicated from the application 20 the customer management system 14. When the request for the VoIP user credentials is received at the customer management system 30, the customer management system creates a VoIP credential signal that is communicated to the VoIP system 40. A signal communicating the updated credentials for the user is communicated from the VoIP system 40 to the customer management system 30. The customer management system 30 then communicates a VoIP user credential signal that is communicated to the application 20 in step 720. The user credentials may include several types of data including the user name, a password, an account name and realm. In step 722, the VoIP system user credentials are stored within the application 20 and the user device 12 associated therewith.

In step 724, a request for an authorization token based on the credentials and account name is communicated from the application 20 to the VoIP system 40. An authorization token is communicated in an authorization signal 722 that is communicated from the VoIP system 40 to the application 20. In step 728, a token that is used for a push notification is communicated from the application 20 and the token management system 220 as illustrated in FIG. 12 therefrom. A public/private key pair is generated in step 730. This may be performed at the decryption system 222 of FIG. 2. After step 730, the public key is communicated to the VoIP system 40 so that it may be used to encrypt the voicemail stored within the VoIP system 40.

Figure 8:
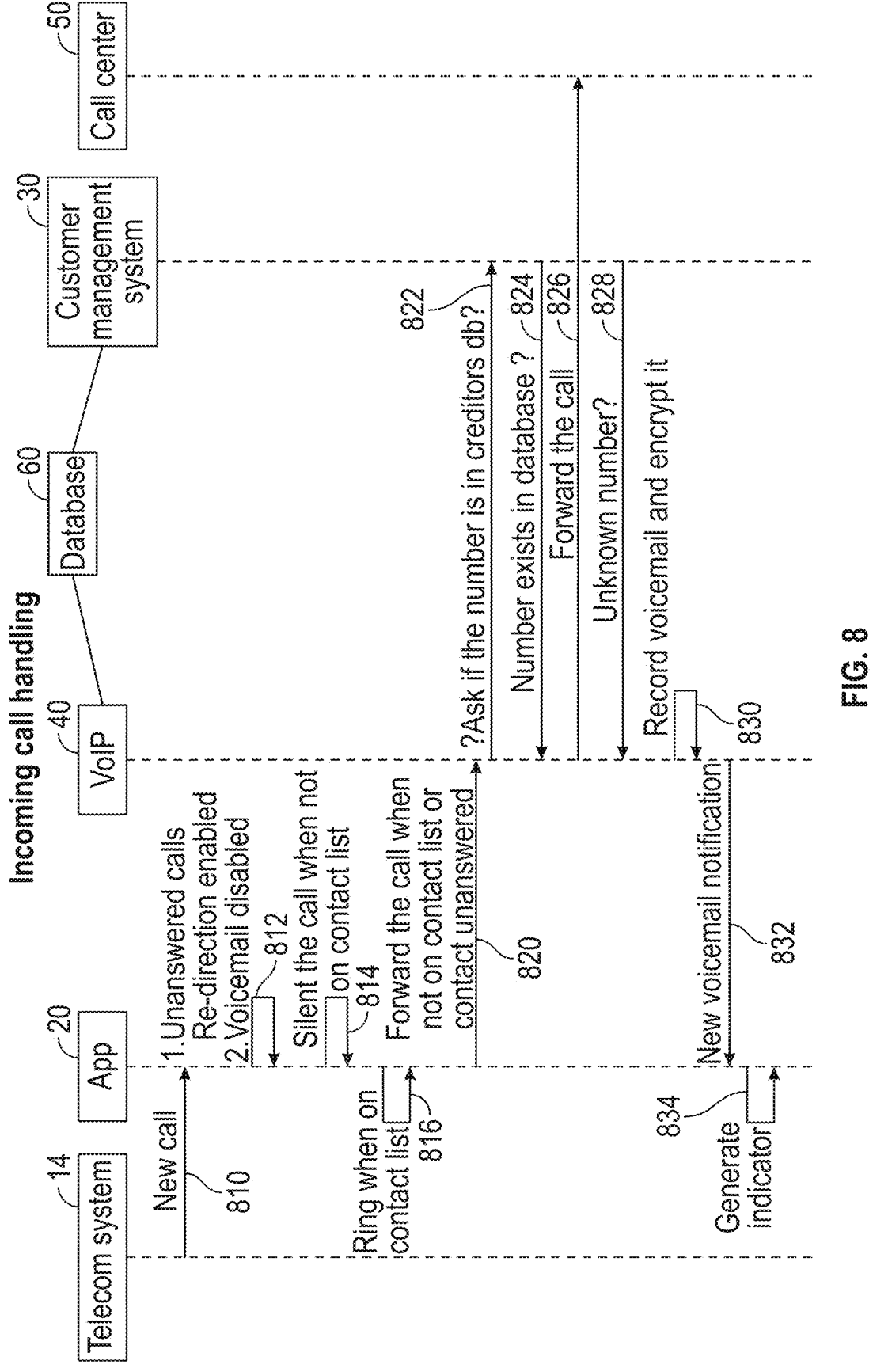
FIG. 8 is a flow diagram for listening to voicemail.

Referring now to FIG. 8, a method for handling incoming calls from the telecom system 14 at the user device having the application 20 therein is set forth. The interaction with the VoIP system 40, the customer management system 30 and the call center 50 are set forth. A new call signal is communicated from the telecom system to the application in step 810. The application has the unanswered call redirection option enabled and the user device voicemail disabled in step 812. That is, the local voicemail for storing voice recordings within the user device and operated by the phone carrier is disabled and ultimately the VoIP system 40 is used. In step 814, the calls are silenced when they are not on the contact list. That is, step 814 compares the caller identification number from the contacts within the phone or user device. The notification or ringing is prevented when the telephone number indicated by the caller ID is not on the contact list. In step 816, when the caller identifier phone number is on the contact list, the phone is allowed to notify (ring), vibrate or both, the user of the incoming call. When the call is not on the contact list, the call is forwarded through the call forwarding system 230 of the user device to VoIP system 40. Step 820 provides the forwarding when the caller identifier is not on the contact list or the phone call is unanswered from step 816.

In step 822, the VoIP system 40 determines whether the phone number associated with the incoming call is a creditor or unwanted caller. Although a signal is communicated from the VoIP system 40 to the customer management system 30, the database 60 may be queried directly from the VoIP system 40 or the customer management system 30 to determine whether the phone number is in the list of unwanted or creditors at the database 60. When the number does exist in the database, a signal may be communicated from the customer management system 30 to the VoIP system 40. Should the VoIP system 40 perform this task, the signal 824 may be internally communicated within the VoIP system 40. When the VoIP system 40 determines the call is an unwanted or creditor call, step 826 forwards the call to the customer call center 50. In step 822, when the customer management system 30 determines that the caller identifier or phone number associated with the call is an unknown number, step 828 communicates an unknown number indicator signal to the VoIP system 40. The VoIP system 40 records a voicemail 830 and encrypts the voicemail. The voicemail is stored in association with the customer account so the customer may ultimately retrieve the voicemail. In step 832, a voicemail notification signal is communicated from the VoIP system 40 to the application 20. The notification signal may be a push notification, an SMS notification or an email that is communicated to the app 20. Ultimately, an indicator is generated at step 834 for providing the notification. The indicator may be a screen display, an email in an inbox or a text (SMS) that is within a text inbox on the user device. The indicator in step 834 may also be an audible indicator in addition to or instead of a visual indicator.

Figure 9:
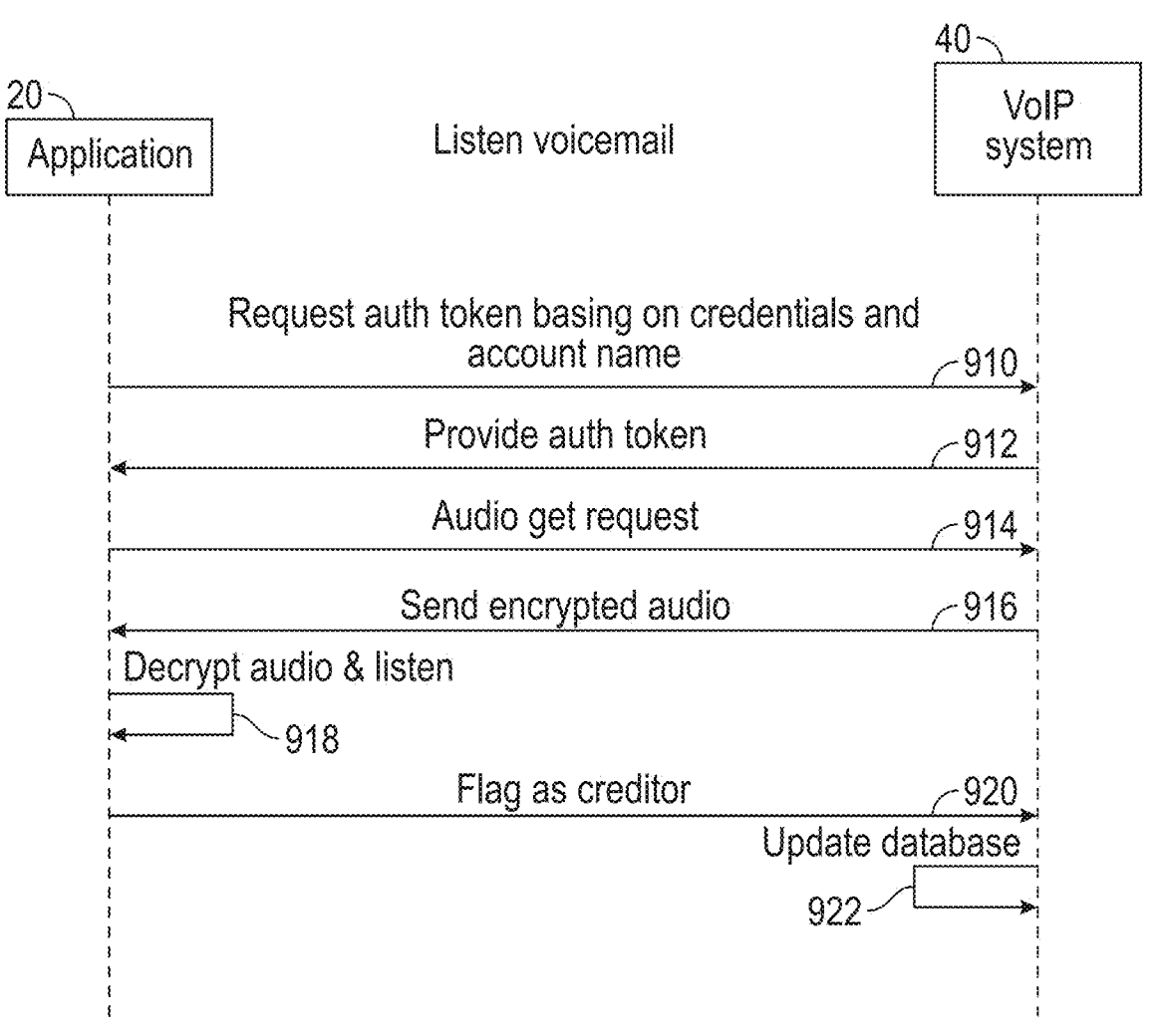
FIG. 9 is a flow diagram of a method for listening to voicemails at the VoIP system.

Referring now to FIG. 9, a method for listening to voicemails at the VoIP system 40 is set forth. The application 20 requests an authorization token based on the credentials in the account name in step 910. An authorization token signal is communicated with the authorization token from the VoIP system 40 to the application 20. An audible "get" request signal is communicated from the application 20 the VoIP system 40 with the authorization token. In step 916, an encrypted audio signal is communicated from the VoIP system 40 to the application 20. In step 918, the application 20 decrypts the audio so that audible signals may be listened to by the user of the user device and the application 20. In step 920, the user may interact with various screen displays as described below to "flag" or otherwise indicate that the caller identifier or number associated with the voicemail is unwanted or a credit. Therefore, the application 20 generates a "flag" signal communicated to the VoIP system 40. A database update signal 922 allows the phone number associated with the unwanted or creditor voicemail to be stored in the database 60 or the database within the VoIP system 40 or the customer management system.

Referring now to FIG. 10, a method for deactivating or reactivating a customer is set forth. In step 1010, the customer management system 10 blocks a user account. This is performed when a user does not pay a monthly fee or when a user requests to be removed. In step 1012, a request for an authorization token based on credentials and an account name is provided to the VoIP system 40. An authorization token is communicated from the VoIP system 40 to the customer management system in step 1014. In step 1016, a reactivation or deactivation of an account or a user is communicated from the customer management system 30 to the VoIP system 40. In step 1018, a confirmation signal is communicated from the VoIP system 40 to the customer management system 30 to confirm the reactivation or the deactivation of an account or a user.

Referring now to FIG. 11, a method for retrieving or recovering credentials is set forth. Temporary credentials for an existing user may be generated at the customer management system 30 in step 1110. In step 1112, credentials may be provided from the application to the customer management system 30. Several types of credentials, such as a password, a user name and other data, may be provided. In step 114, an authorization signal indicating that the authorization has passed is communicated from the customer management system 30 to the application 20. VoIP credentials may requested by the application 20 to the customer management system 30 so that various actions may be performed. In step 1118, existing VoIP credentials may be updated by communicating a signal from the customer management system 30 to the VoIP system 40. A user name and other types of data may be communicated to the VoIP system 40 from the customer management system 30. In step 1120, a confirmation signal is communicated from the VoIP system 40 to the customer management system 30 to indicate that the credentials have been updated. In step 1122, the customer management system 30 communicates a credential signal that includes the updated credentials from the VoIP system 40 to the application 20 to update the system. In this manner, the application 20 may then be allow to retrieve voicemails and otherwise communicate with the VoIP system 40.

Figure 12A:
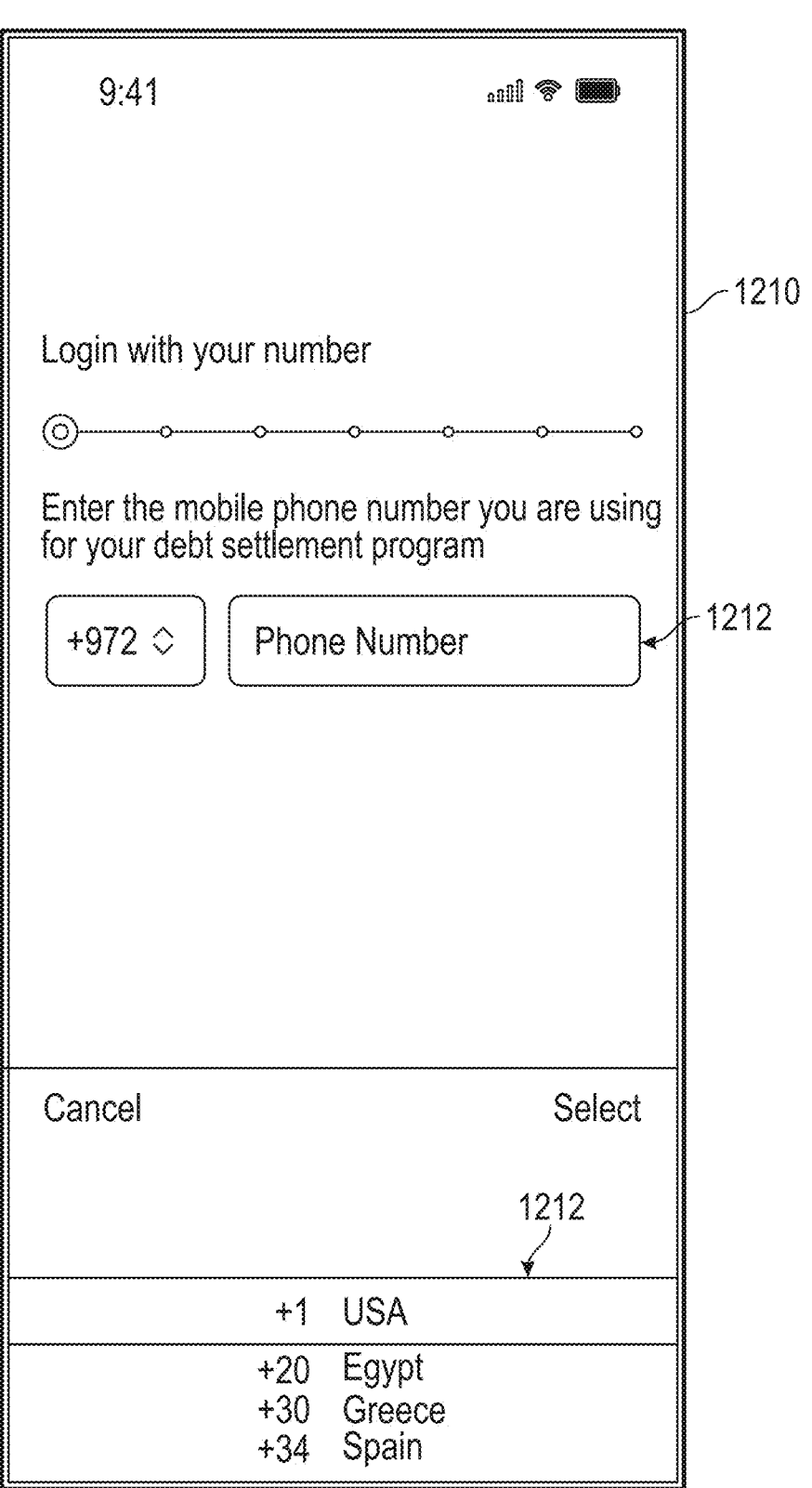
FIG. 12A is a screen display showing the entering of a phone number for the application.

Referring now to FIG. 12A, a screen display 1210 for logging in with your phone number is set forth. A phone number selected 1212 may be provided along with the country code and the like.

Figure 12B:
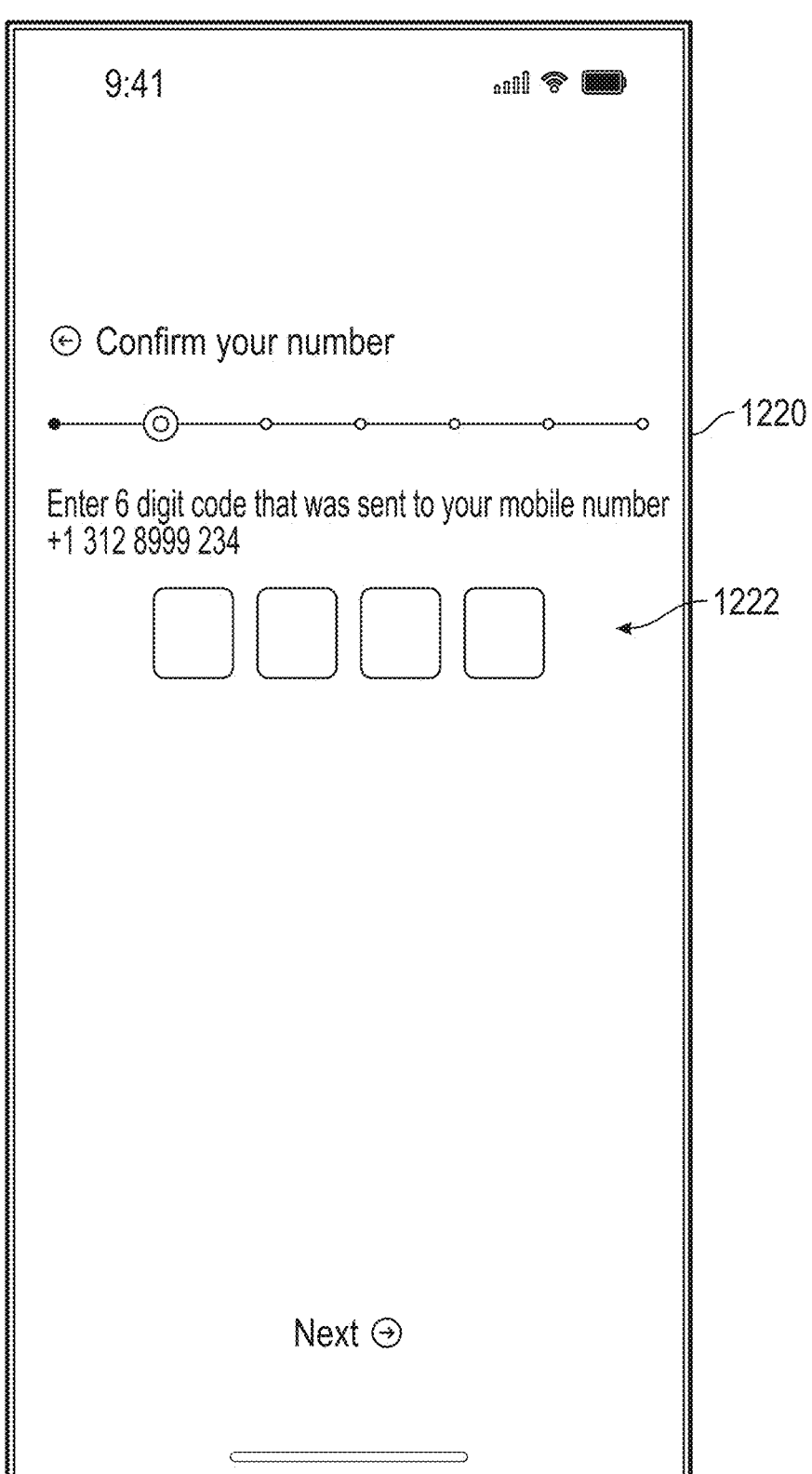
FIG. 12B is a screen display for confirming the number entered in FIG. 12A.

Referring now to FIG. 12B, a screen display 1220 for confirming a confirmation number for the user device may be entered. A text, telephone call or email may be used to provide a code to be entered in a confirmation entry 1222 for confirmation.

Figure 12C:
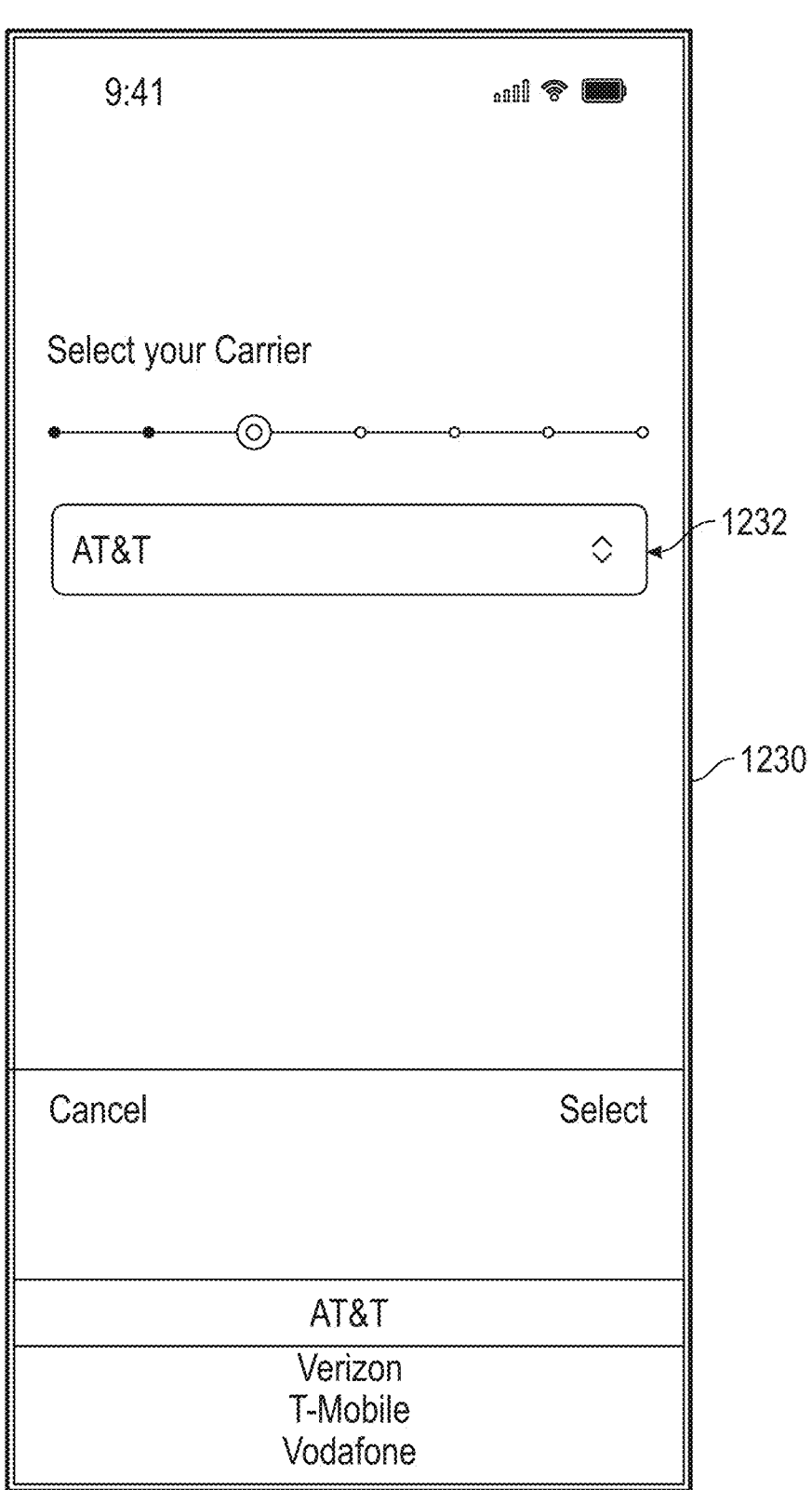
FIG. 12C is a screen display for selecting your phone provider.

Referring now to FIG. 12C, a screen display 1230 is illustrated for selecting a carrier in the carrier block 1232. Certain carriers have different types of protocols when accessing, enabling or disabling features such as call forwarding and voicemail.

Figure 12D:
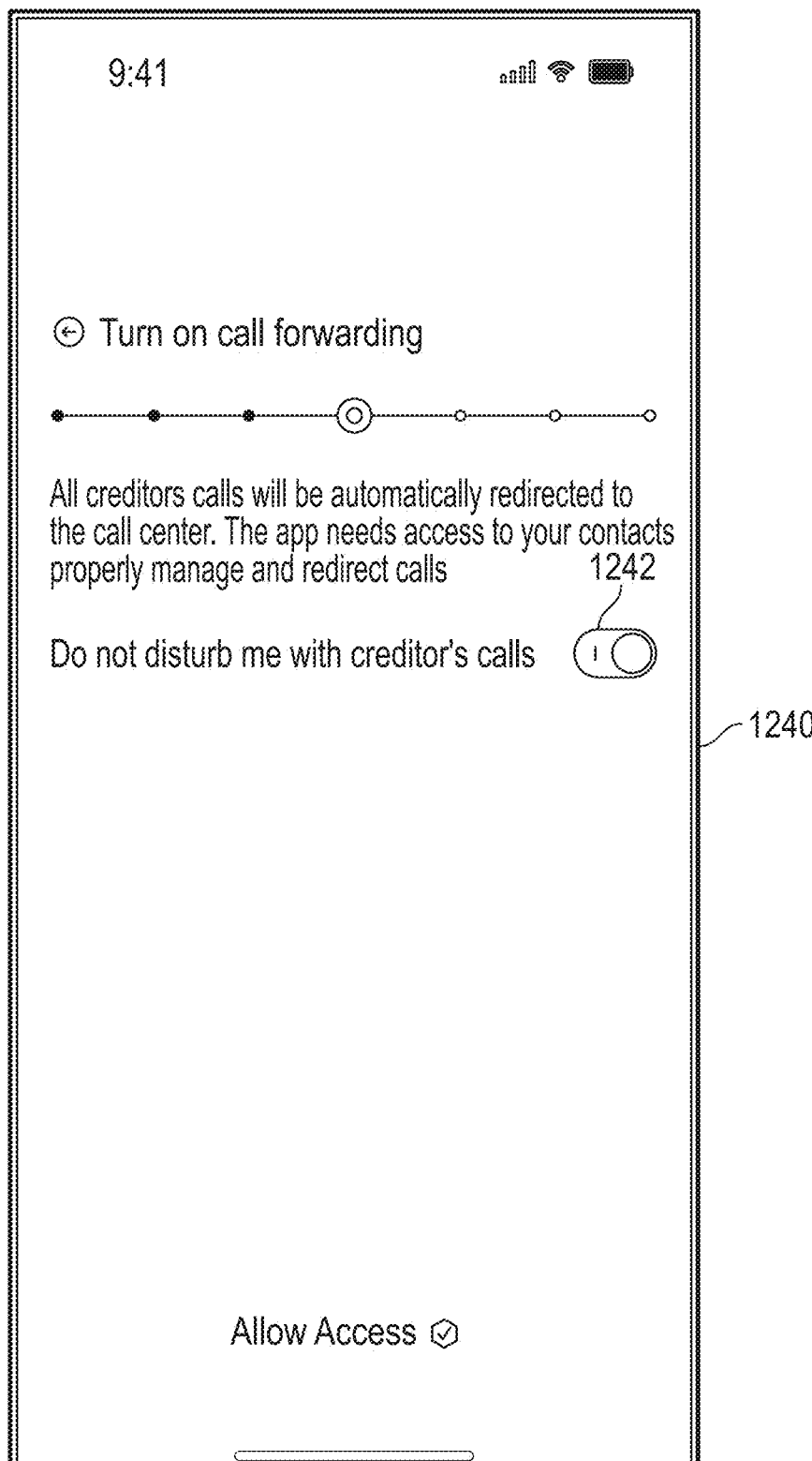
FIG. 12D is a screen display for enabling call forwarding.

Referring now to FIG. 12D, a screen display 1240 is set forth. A slide selector 1242 may be selected for enabling the forwarding of unwanted calls. The slide selector 1242 is a touch screen device that allows the application to manage and redirect unwanted phone calls.

Figure 12E:
FIG. 12E is a screen display of a confirmation screen for allowing access to contacts.

Referring now to FIG. 12E, the screen display 1240 may have a confirmation box 1244 that pops up to confirm whether the user wants the user device to access contacts. For the device and application to work properly, the user device must be allowed to access the contacts.

Figure 12F:
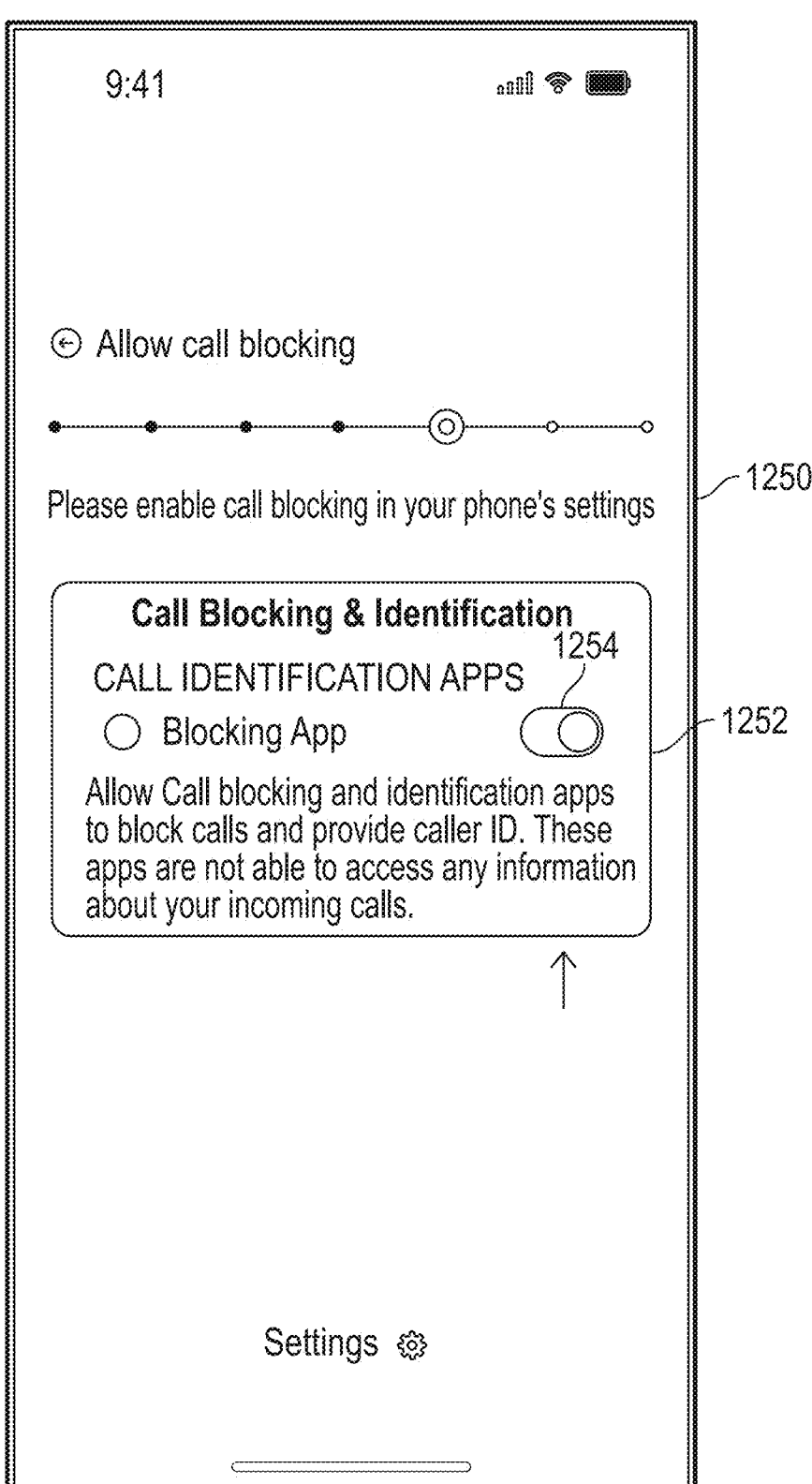
FIG. 12F is a confirmation screen display for blocking and identifying phone calls.

Referring now to FIG. 12F, a screen display 1250 for blocking and identifying phone signals is provided. The box 1252 provides a slide dial 1254 for allowing blocking and identification apps to provide the caller identification.

Figure 12G:
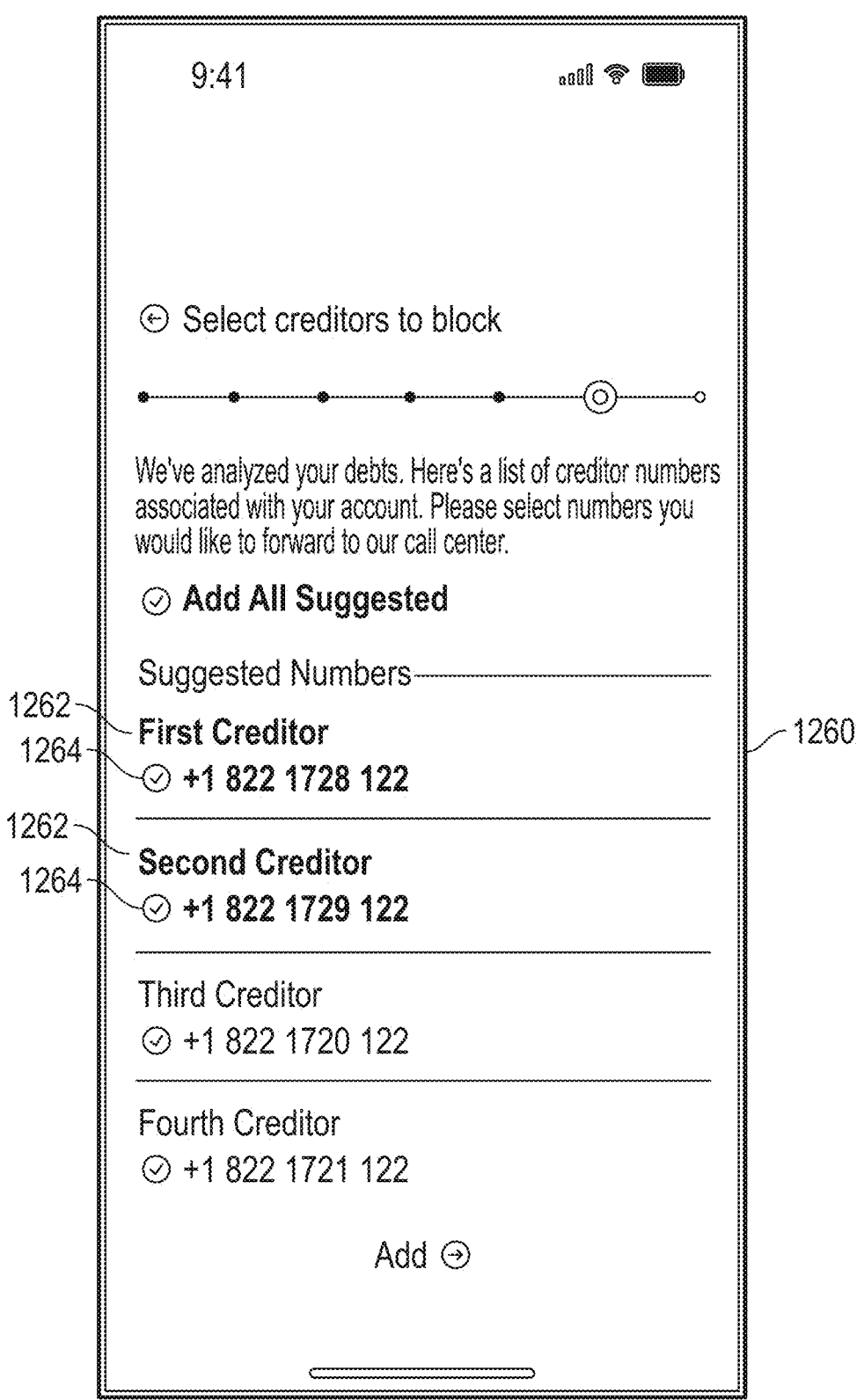
FIG. 12G is a screen display for adding creditors or unwanted phone numbers to the system.

Referring now to FIG. 12G, a screen display 1260 is set forth. A list of creditors may be provided with identifiers 1262. A selection block 1264 may be provided in front of each of the creditors to allow the creditors to be selected. It should be noted that although one phone number is provided in front of the creditor name, creditors may have multiple phone numbers that are stored within the database so that when the name is selected, all of the numbers associated with the creditor may be blocked.

Figure 12H:
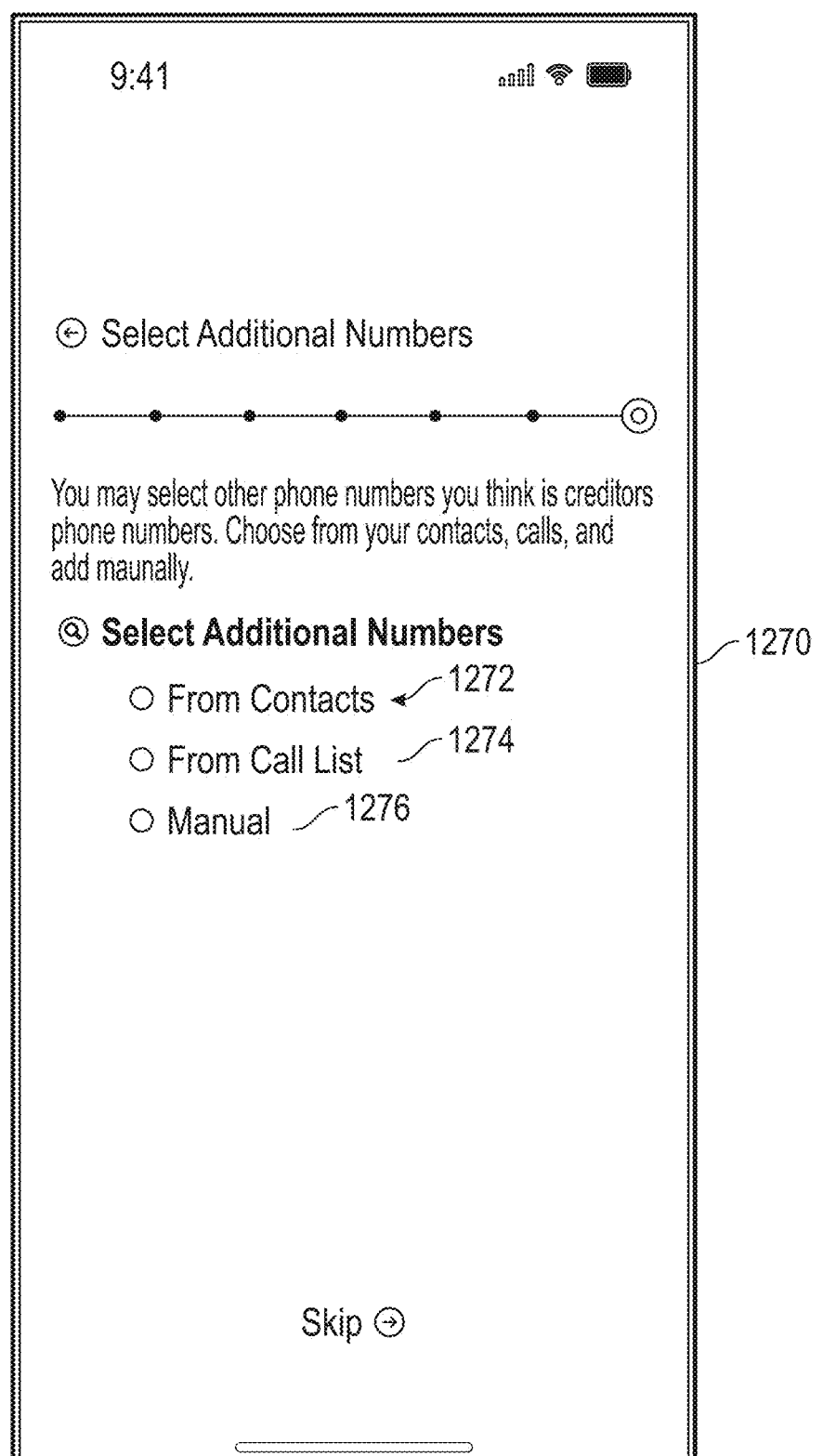
FIG. 12H is a screen display for entering additional numbers.

Referring now to FIG. 12H, a screen display 1270 for selecting additional numbers is set forth. A plurality of choices such as selecting from contacts 1272, selecting from a call list 1274 or manually entering contacts in 1276 may be performed. When the selectors are performed, the contact list, the call list or a keypad for manually entering may be provided, respectively.

Figure 13A:
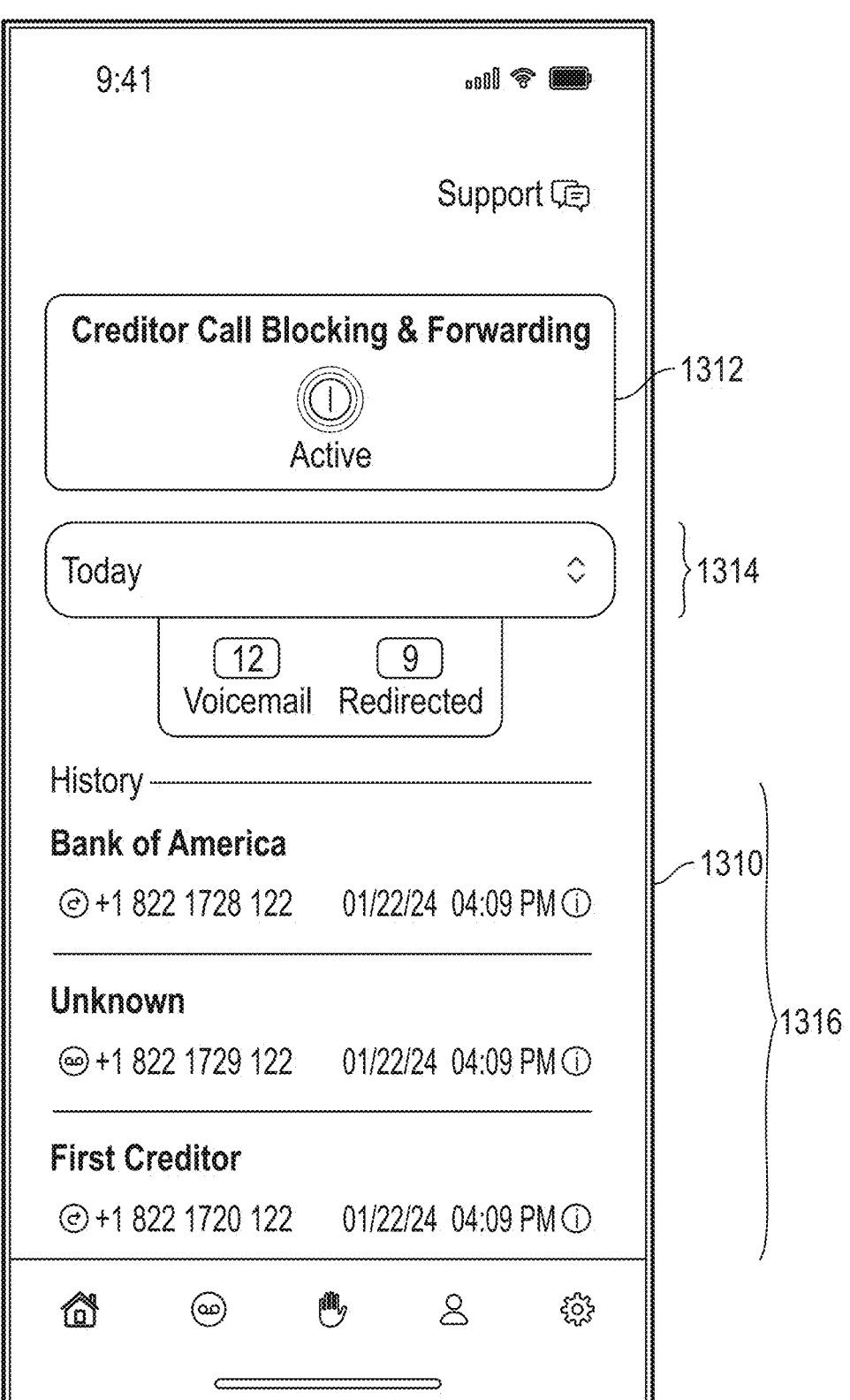
FIG. 13A is a screen display showing various portions for various purposes including call block, the number of voicemails, redirection quantities and a history list.

Referring now to FIG. 13A, a screen display 1310 providing a summary of the status of various aspects of the application is provided. A block 1312 generates a screen display indicating that call forwarding and blocking has been enabled. A block 1314 may provide a voicemail summary and redirected call summary for a selected day. In this example, "today" has been selected. A history portion 1316 provides the history of the voicemail call numbers, the time and the date. Thus, the caller ID information may be displayed as well as a name associated with the telephone number.

Figure 13B:
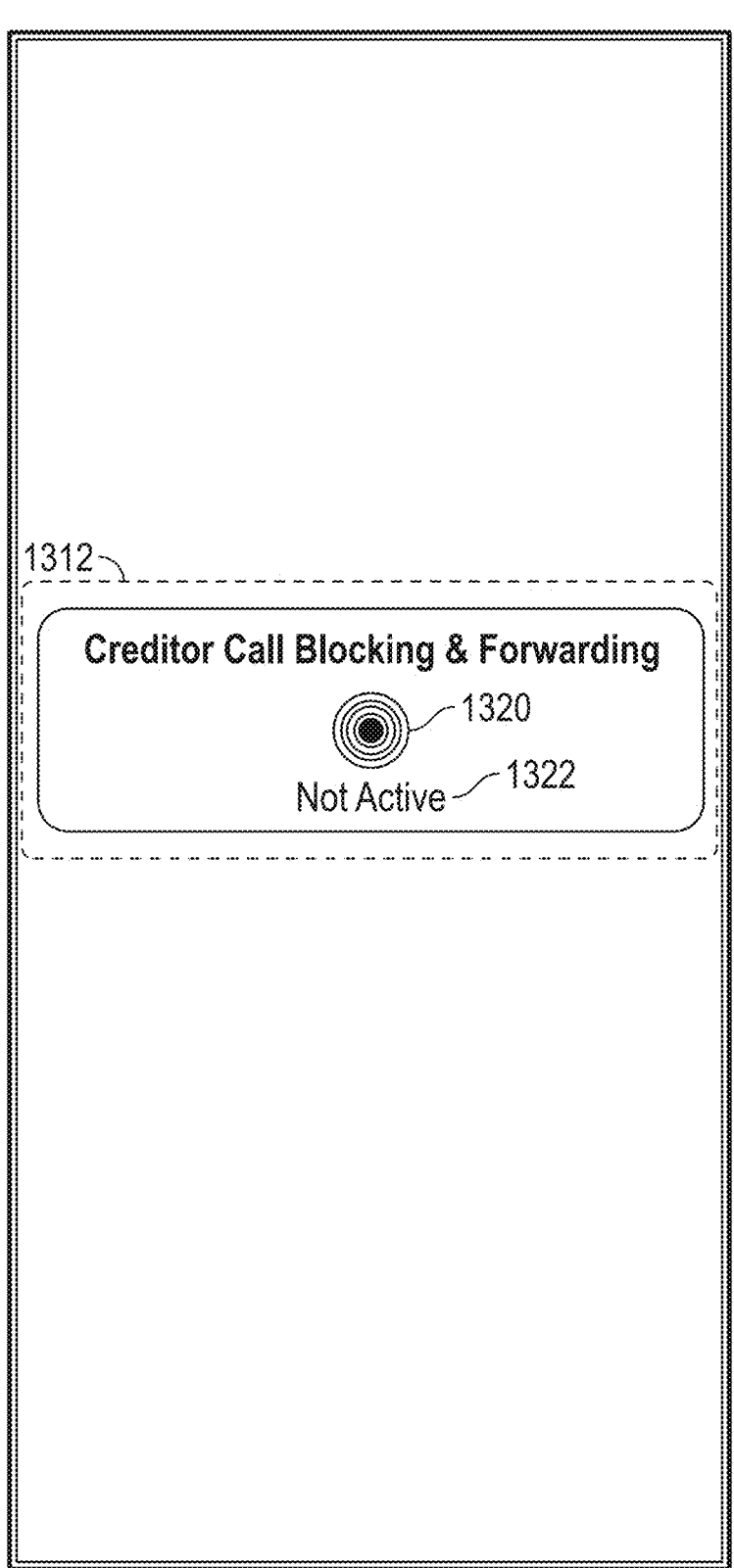
FIG. 13B is a partial screen display illustrating the call blocking and forwarding is not activated.

In FIG. 13B, the block 1312' may be displayed when call blocking and forwarding is not active. A not active indicator 1320 may be colored or illuminated to indicate call blocking is not active. Words 1322 may also indicate the blocking and forwarding is not active.

Figure 13C:
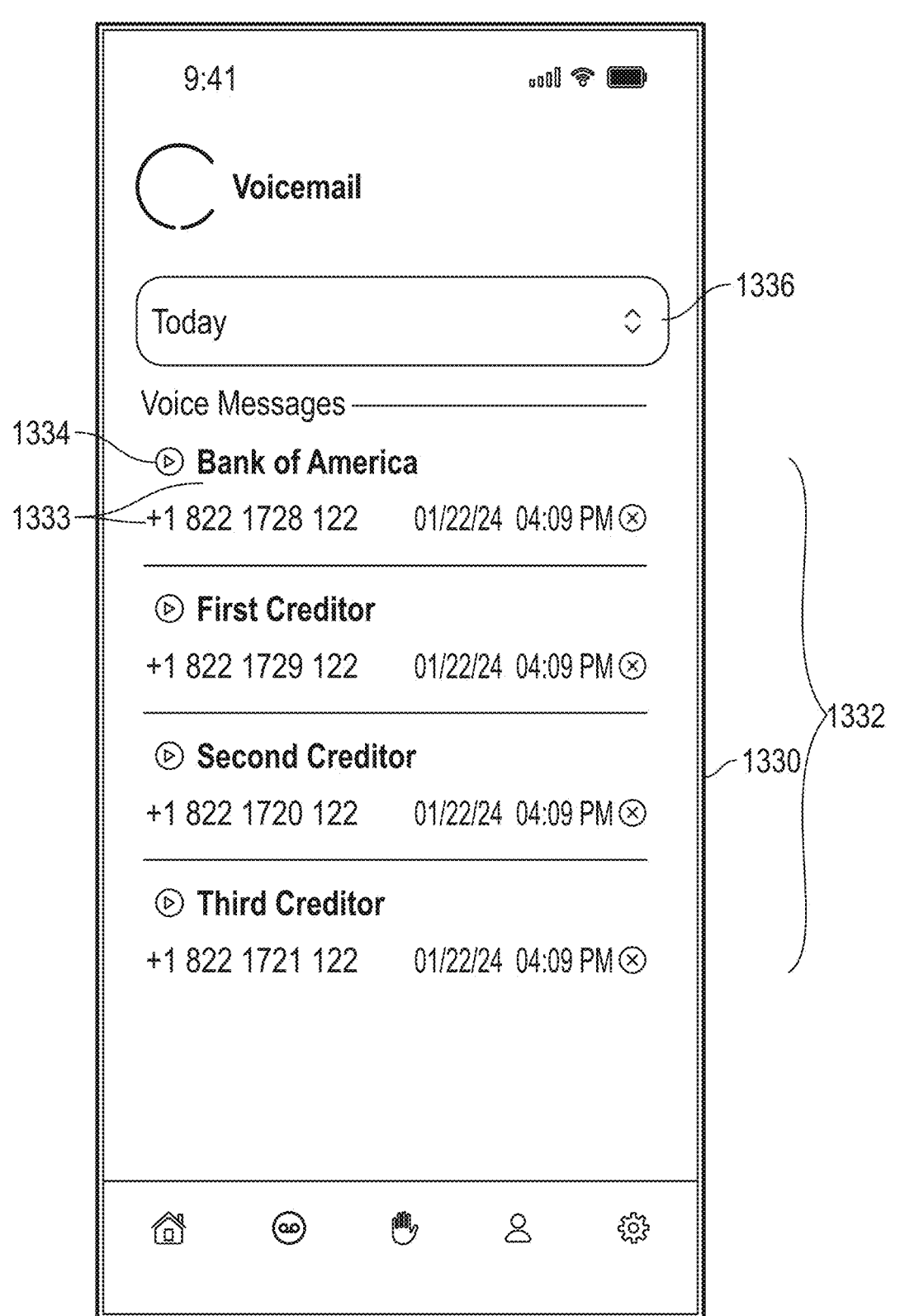
FIG. 13C is a screen display illustrating the voicemails and providing a selector for receiving the voicemails.

Referring now to FIG. 13C, a screen display 1330 is illustrated and provides the list 1332 corresponding to voicemails that are stored within the VoIP system 40. An origin identifier 1333 such as a name and a telephone number and a playback selector 1334 may be displayed. Selecting the playback selector may cause a retrieval signal to be communicated to the VoIP system and the recorded voicemail to be communicated to the user device for playback. A date block 1336 allows the user to select the day from which various voicemails may be selected. Of course, various screens or numbers of screens may be provided.

Figure 13D:
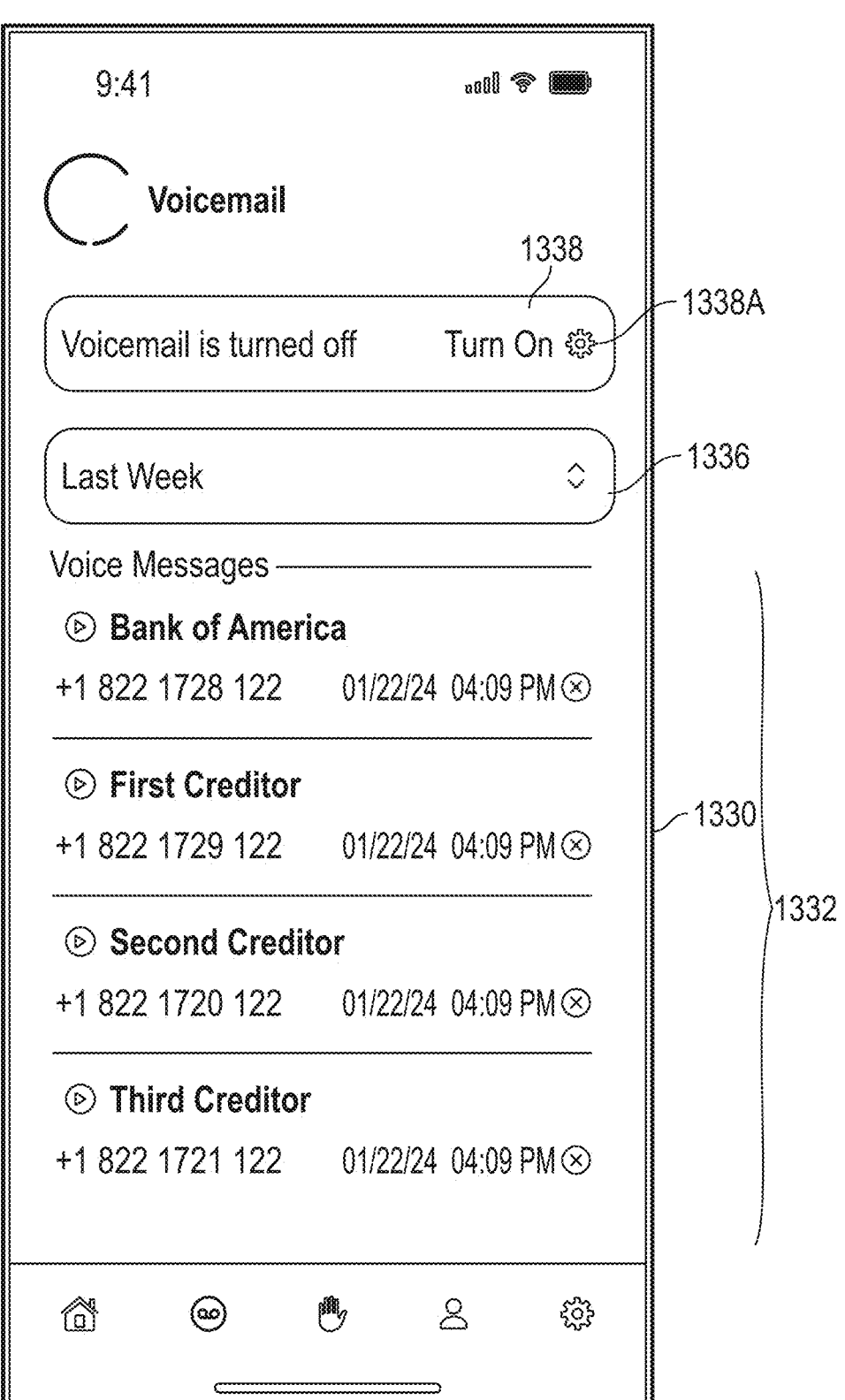
FIG. 13D is a screen display illustrating a different time frame for displaying voicemails with an indicator that voicemails have been turned off.

In FIG. 13D, the screen display 1330 of FIG. 13C is illustrated with the date selection box selecting "Last Week". The creditor list 1332 or unwanted phone number list is also provided. An indicator box 1338 may provide an indicator that the voicemail system has been turned off. A selector 1338A may be used to select and "turn on" the voicemail system.

Figure 13E:
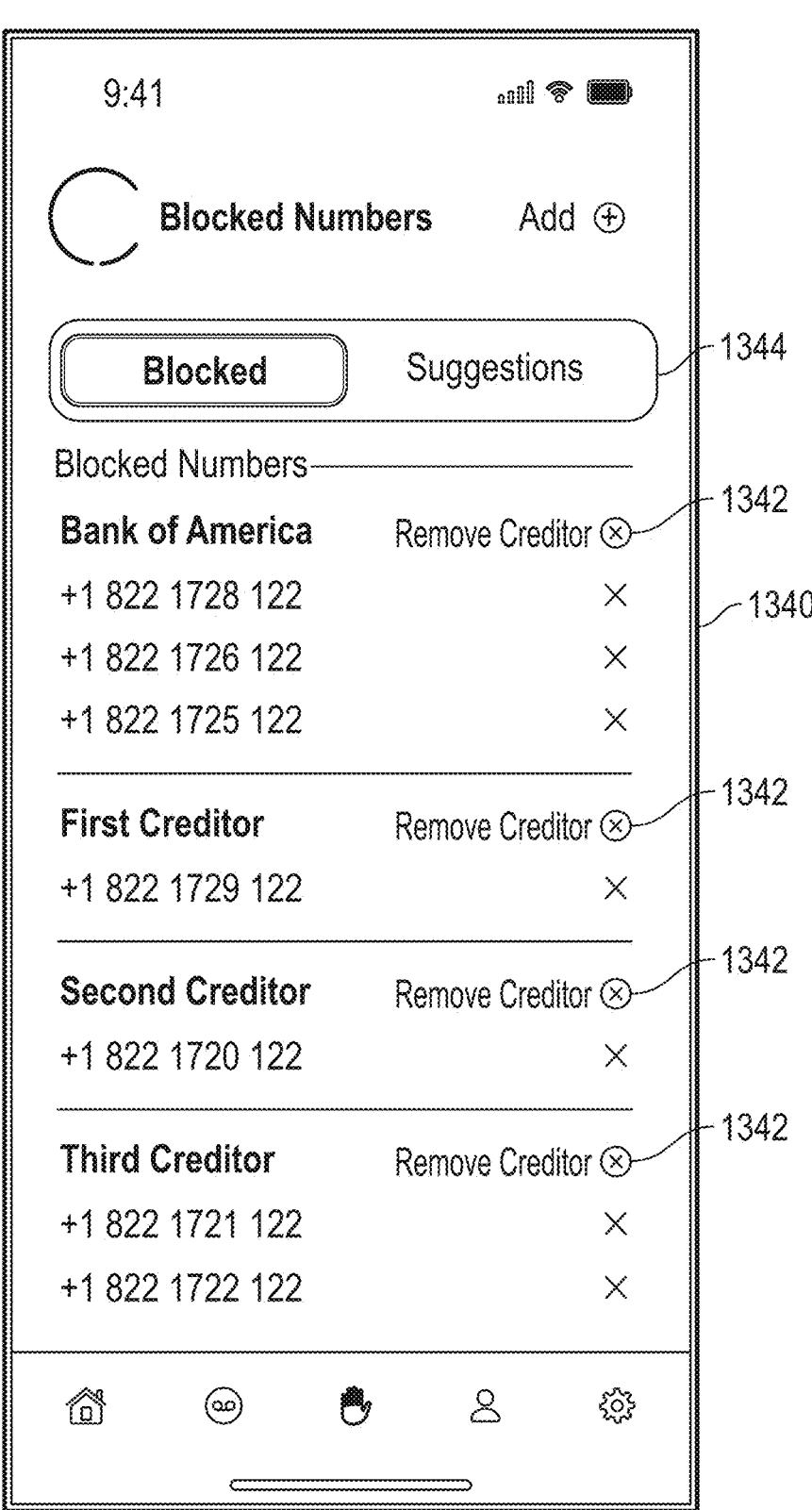
FIG. 13E is a list of numbers that are blocked with selector for removing the creditor or unwanted phone number from the list.

Referring now to FIG. 13E, a screen display 1340 showing blocked or unwanted telephone numbers is provided. A selector 1342 may be selected next to the unwanted phone numbers to remove the creditor from the unwanted phone number list. A status selector 1344 is provided for the user to select the display of blocked numbers or suggestions.

Figure 13F:
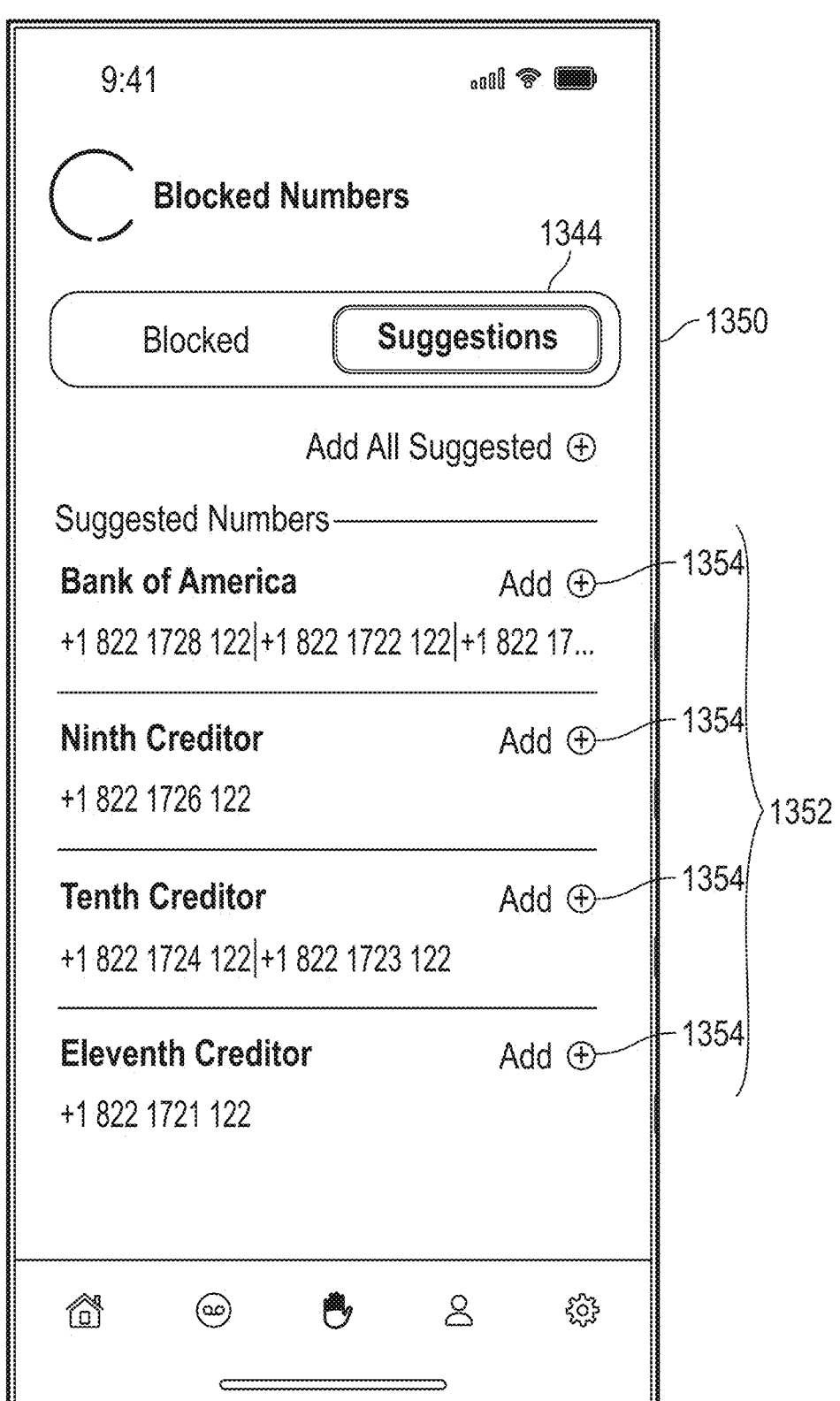
FIG. 13F is a screen display illustrating suggested unwanted callers with selectors for adding the suggestions to the list.

Referring now to FIG. 13F, a selection screen display 1350 is illustrated. In this example, the selector 1344 has the "suggestions" block selected. In this example, a list 1352 of suggested creditors or unwanted phone numbers is provided for possible addition to the database associated with the user of the user device. By selecting the selectors 1354 next to each entry on the list 1352, a selection signal may be communicated to a VoIP system or the customer management system so the unwanted number may be added to the database.

Figure 13G:
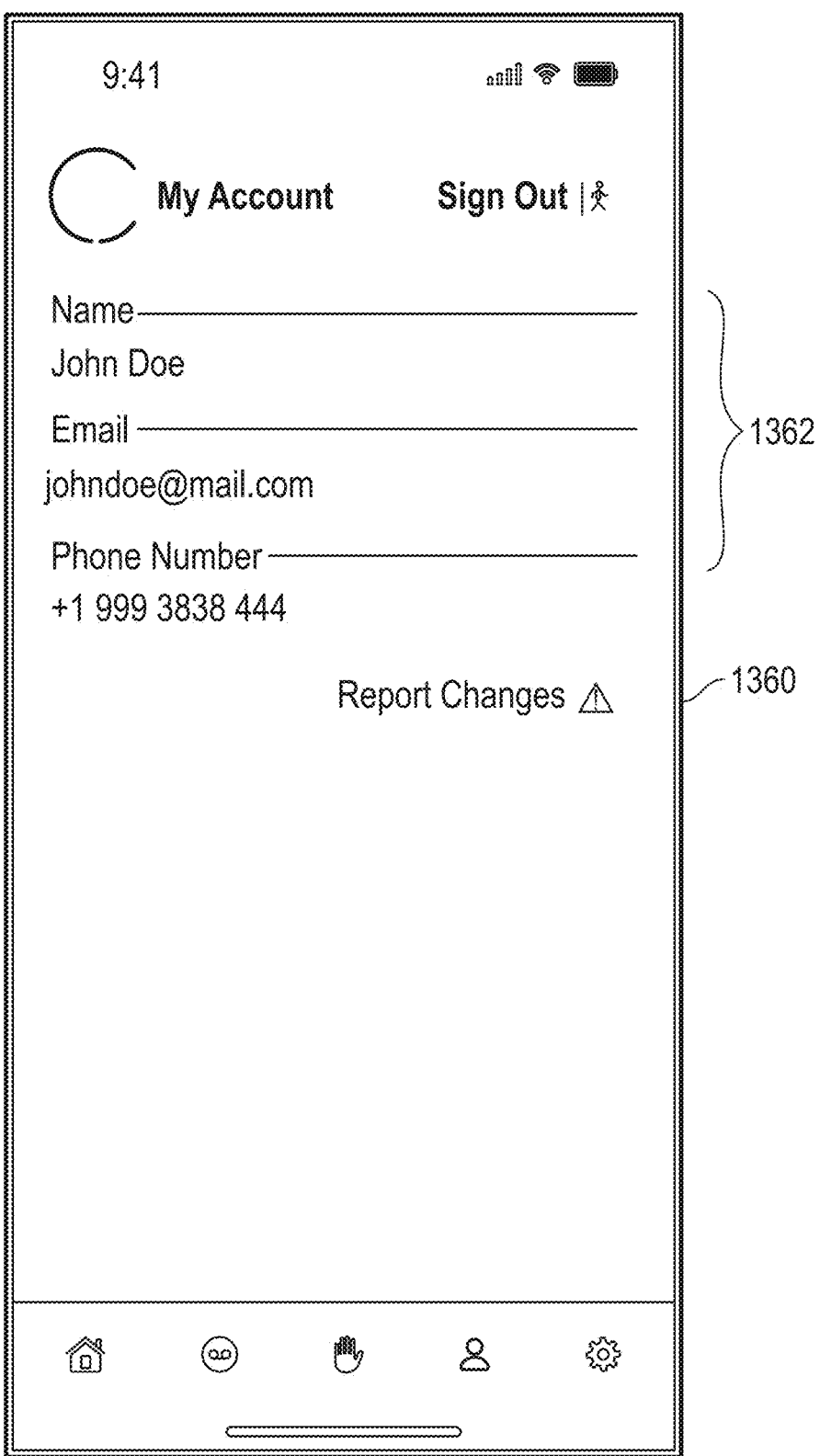
FIG. 13G is a screen display for providing account information.

Referring now to FIG. 13G, a screen display 1360 showing a list 1362 of account information such as name, phone number and email may be provided with each account and displayed for the user.

Figure 13H:
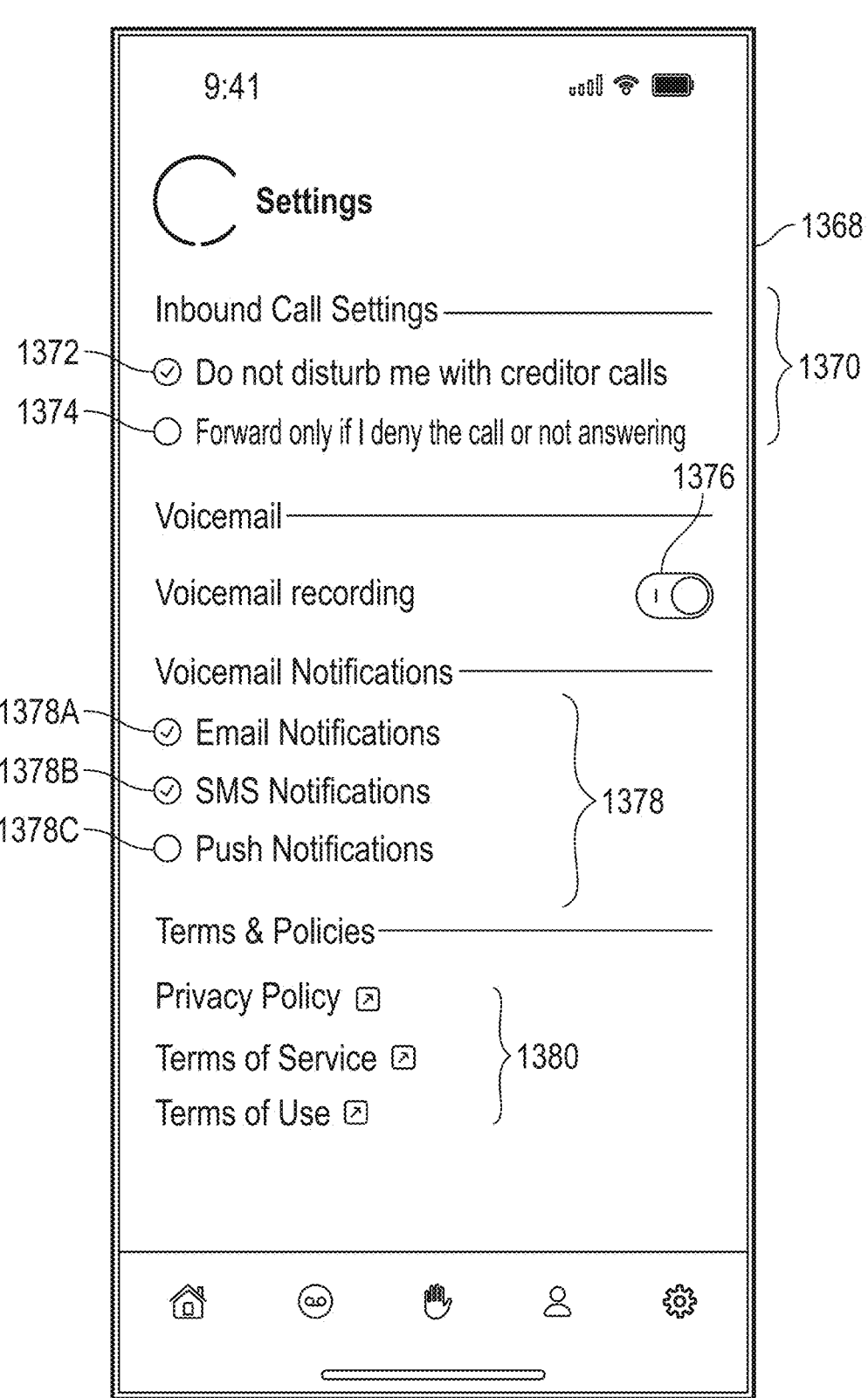
FIG. 13H is a screen display that has various settings for the user to customize the operation of the app.

Referring now to FIG. 13H, a screen display 1368 with various settings may be provided for the system. In this example, an inbound call setting area 1370 is provided. A selector 1372 or selector 1374 may be used for respectively selecting "do not disturb me creditor calls" or "forward only if I deny the call or not answer." That is, a call may be denied by the user after ringing on the user device and enabled by selecting the selector 1374. If all calls from credits are to be rerouted, selector 1372 is selected. A voicemail selector 1376 may be selected to allow the VoIP system 40 to record voicemails. The type of notifications for a voicemail may be selected from the list 1378. In this example, one or more selectors 1378A, 1378B or 1378C may be provided and selected individually or in combination. In this example, selector 1378A corresponds to email notifications, selector 1378B corresponds to texts or "SMS" notifications and 1378C corresponds to push notifications. Other selectors 1380 may be provided for various other purposes including providing the privacy policy, the terms of service and the terms of use.

In FIGS. 13A-13H, representative screen displays that are displayed on the display 214 of the user device 12 are set forth. Different layouts, different data and the like may be provided.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of redirecting phone calls comprising:
storing a plurality of unwanted phone numbers in a database;
receiving, at a user device, a phone call signal having a phone number associated therewith;
forwarding the phone call from the user device to a Voice over Internet Protocol (VoIP) system when the phone number is not in a contact list of the user device or the phone call is unanswered at the user device;
determining whether the phone number is in the database;
when the number is stored in the database, forwarding the phone call to a call center from the VOIP system
storing a voicemail message at the VOIP system;
communicating a voicemail notification to the user device;
displaying the phone number associated with the call at the user device;
generating a screen display with the phone number and a selector corresponding to whether the phone call is unwanted;
thereafter, receiving a selection signal after selecting the selector and storing the phone number in the database to form an updated database when the phone call is unwanted; and
accessing the updated database when a second phone call is received at a second user device different than the user device to determine whether to forward the second phone call to the VoIP system.

14

2. The method of claim 1 wherein further comprising selecting a plurality of phone numbers from a selection screen display displayed on a display of the user device to form the plurality of unwanted phone numbers, and further comprising communicating the plurality of unwanted phone numbers from the user device to the database.

3. The method of claim 1 wherein storing the voicemail comprises encrypting the voicemail prior to storing.

4. The method of claim 1 wherein communicating the voicemail notification comprises communicating one of a push notification, text notification and an SMS notification.

5. A system for redirecting phone calls comprising:
a database storing a plurality of unwanted phone numbers;
a Voice over Internet Protocol (VoIP) system in communication with the database;
a user device in communication with the VoIP system, said user device receiving a phone call signal having a phone number associated therewith, said user device forwarding the phone call to the VoIP system when the phone number is not in a contact list of the user device and when the phone number is not in a contact list of the user device or the phone call is unanswered at the user device;
a call center; and
said VoIP system determining whether the phone number is in the database, when the number is stored in the database, forwarding the phone call to the call center; storing a voicemail message and communicating a voicemail notification to the user device;
said user device displaying the phone number associated with the call, generating a screen display with the phone number and a selector corresponding to whether the phone call is unwanted;
said database receiving a selection signal after selecting the selector and storing the phone number therein to form an updated database when the phone call is unwanted; and
a second user device accessing the updated database when a second phone call is received different than the user device to determine whether to forward the second phone call to the VoIP system.

6. The system of claim 5 wherein user device forwards the phone call when the phone call is on a contact list and the phone call is not answered at the user device, said VoIP system storing a voicemail for the phone call.

7. The system of claim 5 wherein the user device generates a selection screen display for selecting a plurality of phone numbers to form the plurality of unwanted phone numbers, and wherein the user device communicates the plurality of unwanted phone numbers to the database.

8. The system of claim 5 wherein the VoIP system determines the phone number is not stored in the database and stores a voicemail therein, said VoIP system communicating a voicemail notification signal to the user device.

9. The system of claim 8 wherein the VoIP system encrypts the voicemail prior to storing.

10. The system of claim 8 wherein the voicemail notification signal comprises communicating one of a push notification, text notification and an SMS notification.

11. The system of claim 8 wherein the user device requests the voicemail from the VoIP system, said VoIP system communicating the voicemail to the user device with the phone number associated therewith.

12. The system of claim 11 wherein the user device, after receiving the voicemail, generates a screen display with the phone number and a selector, and said user device generating a selection signal after selecting the selector and thereafter storing the phone number in the database.

13. A method of blocking creditor calls comprising:

selecting a plurality of creditor phone numbers from a user device;

storing the plurality of creditor phone numbers in a database;

receiving, at the user device, a phone call signal having a phone number associated therewith;

forwarding the phone call signal to a Voice over Internet Protocol (VoIP) system when the phone number is not in a contact list of the user device and when the phone number is not in a contact list of the user device or the phone call is unanswered at the user device;

determining whether the phone number is in the database;

when the number is stored in the database, forwarding the call to a call center from the VOIP system;

storing a voicemail message at the VOIP system: communicating a voicemail notification to the user device, displaying the phone number associated with the call at the user device, generating a screen display with the phone number and a selector corresponding to whether the phone call is unwanted;

thereafter, receiving a selection signal after selecting the selector and storing the phone number in the database to form an updated database when the phone call is unwanted; and accessing the updated database when a second phone call is received at a second user device different than the user device to determine whether to forward the second phone call to the VoIP system.

14. The method of claim 13 wherein when the phone number is not stored in the database, storing a voicemail at the VoIP system and communicating a voicemail notification signal to the user device.

15. The method of claim 14 further comprising requesting the voicemail from the VoIP system, communicating the voicemail to the user device with the phone number associated therewith and receiving the voicemail at the user device.

16. The method of claim 15 wherein after receiving the voicemail at the user device, generating a screen display with the phone number and a selector, and thereafter, receiving a selection signal after selecting the selector and storing the phone number in the database.

\* \* \* \* \*